United States Patent
Takahashi et al.

(10) Patent No.: US 8,199,621 B2
(45) Date of Patent: Jun. 12, 2012

(54) WRITE-ONCE INFORMATION RECORDING MEDIUM, INFORMATION RECORDING APPARATUS, INFORMATION RECORDING METHOD, INFORMATION REPRODUCING APPARATUS AND INFORMATION REPRODUCING METHOD

(75) Inventors: Yoshihisa Takahashi, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 12/649,412

(22) Filed: Dec. 30, 2009

(65) Prior Publication Data

US 2010/0246364 A1  Sep. 30, 2010

Related U.S. Application Data

(60) Provisional application No. 61/142,936, filed on Jan. 7, 2009.

(51) Int. Cl.
G11B 7/00 (2006.01)

(52) U.S. Cl. .................................................. 369/53.17

(58) Field of Classification Search .............. 369/53.17, 369/275.3, 59.25
See application file for complete search history.

(56) References Cited

U.S. PATENT DOCUMENTS

| | | | |
|---|---|---|---|
| 6,385,232 B1 | 5/2002 | Terashima | |
| 7,188,271 B2 | 3/2007 | Park et al. | |
| 7,428,202 B2 | 9/2008 | Takahashi et al. | |
| 7,506,109 B2 * | 3/2009 | Park | 711/154 |
| 7,616,541 B2 | 11/2009 | Yoshida et al. | |
| 7,675,828 B2 | 3/2010 | Park et al. | |
| 2004/0174793 A1 * | 9/2004 | Park et al. | 369/59.25 |
| 2004/0179458 A1 * | 9/2004 | Hwang et al. | 369/275.3 |
| 2004/0223440 A1 * | 11/2004 | Park | 369/59.25 |
| 2004/0246851 A1 | 12/2004 | Hwang et al. | |
| 2005/0169132 A1 | 8/2005 | Kuraoka et al. | |
| 2006/0187811 A1 | 8/2006 | Koda et al. | |
| 2006/0233078 A1 | 10/2006 | Terada et al. | |
| 2007/0014200 A1 | 1/2007 | Yoshida et al. | |
| 2007/0122124 A1 | 5/2007 | Park et al. | |
| 2007/0280081 A1 | 12/2007 | Yamanaka | |
| 2008/0112292 A1 * | 5/2008 | Hwang et al. | 369/53.17 |
| 2008/0165647 A1 | 7/2008 | Kwon et al. | |
| 2010/0329098 A1 | 12/2010 | Takahashi et al. | |

FOREIGN PATENT DOCUMENTS

| | | |
|---|---|---|
| JP | 2000-251446 | 9/2000 |
| JP | 2006-512699 | 4/2004 |
| JP | 2006-520513 | 9/2004 |

(Continued)

OTHER PUBLICATIONS

Co-pending U.S. Appl. No. 12/899,680, filed Oct. 7, 2010.

(Continued)

*Primary Examiner* — Latanya Bibbins
(74) *Attorney, Agent, or Firm* — Renner, Otto, Boisselle & Sklar, LLP

(57) ABSTRACT

According to the present invention, multiple space bitmaps (SBMs #0 and #1 30) are provided for the user data area of each recording layer. A disc management structure update unit including one of those space bitmaps and a disc definition structure (TDDS 32) and having a size of one block is written on a management information area (TDMA 17). As a result, data including the disc definition structure (TDDS 32) can always be arranged in the first block at the top of the management information area (TDMA 17).

10 Claims, 19 Drawing Sheets

FOREIGN PATENT DOCUMENTS

| | | |
|---|---|---|
| JP | 2005-056542 | 3/2005 |
| JP | 3861856 | 10/2006 |
| JP | 3865261 | 10/2006 |
| JP | 2007-179695 | 7/2007 |
| JP | 2007-323695 | 12/2007 |
| WO | 2004/029941 A1 | 4/2004 |
| WO | 2004/081926 A1 | 9/2004 |
| WO | 2004/081936 A1 | 9/2004 |
| WO | 2005/091291 A1 | 9/2005 |

OTHER PUBLICATIONS

Search Report for corresponding International Application No. PCT/JP2009/007307 mailed Jan. 26, 2010.

Form PCT/ISA/237 for International Application No. PCT/JP2009/007307 dated Jan. 26, 2010.

Blu-ray Disc Reader, published by Ohmsha, Ltd., pp. 13-28 with a concise explanation.

White paper, Blu-ray Disc Format, General, Aug. 2004, pp. 1-37.

White paper, Blu-ray Disc Format, 3. File System Specifications for BD-RE, R, ROM, Aug. 2004, pp. 1-6.

White paper, Blu-ray Disc Format, 4. Key Technologies, Aug. 2004, pp. 1-8.

Office Action for co-pending U.S. Appl. No. 12/899,680 dated Oct. 3, 2011.

* cited by examiner

CONVENTIONAL ART

WRITE-ONCE INFORMATION RECORDING MEDIUM, INFORMATION RECORDING APPARATUS, INFORMATION RECORDING METHOD, INFORMATION REPRODUCING APPARATUS AND INFORMATION REPRODUCING METHOD

This application claims priority under 35 U.S.C. §119 to U.S. Provisional Application No. 61/142,936 filed Jan. 7, 2009, which is incorporated herein by reference in its entirety.

BACKGROUND OF THE INVENTION

1. Field of the Invention

The present invention relates to an information recording medium, which includes bitmap information indicating whether each area has already been recorded or has not been recorded yet and on which a random write operation can be performed, and also relates to a method and apparatus for reading and/or writing from/to such a recording medium. The present invention is applicable particularly effectively to a write-once optical disc such as a high-density BD-R on which a write operation can be performed only once and to reading and writing from/on such a disc.

2. Description of the Related Art

Recently, various removable information storage media with huge storage capacities and disc drives for handling such media have become immensely popular. Examples of known removable information storage media with big storage capacities include optical discs such as DVDs and Blu-ray Discs (which will also be referred to herein as "BDs"). An optical disc drive performs a read/write operation by making tiny pits (or marks) on a given optical disc using a laser beam, and therefore, can be used effectively to handle such removable information storage media with huge storage capacities. Specifically, a red laser beam is used for DVDs, while a blue laser beam, having a shorter wavelength than the red laser beam, is used for BDs, thereby making the storage density and storage capacity of BDs higher and greater than those of DVDs. As for a BD-R, for example, a maximum storage capacity of as much as 27 gigabytes per recording layer has been realized.

For example, there is an optical disc that uses a phase change type recording material for its recording layer. A phase change type optical disc is irradiated with a laser beam and the atomic bonding state of a thin-film substance, which has been deposited on its recording layer, is locally varied with the energy injected, thereby writing information there. Also, when irradiated with a laser beam with much lower power than the one used for recording, the optical disc has its reflectance varied due to such a difference in physical condition. And if the magnitude of such a variation in reflectance is detected, the information stored there can be read out.

Phase change type optical discs include rewritable optical discs, on which information can be rewritten a number of times by using a phase change type recording material for its recording layer, and write-once optical discs, on which information can be written only once. If a mark edge write operation is performed on such a write-once optical disc, the disc is irradiated with a laser beam that has been modulated into a multi-pulse train to vary the physical condition of the recording material, thereby leaving recording marks there. And information is read out from such a write-once optical disc by sensing a variation in reflectance between those marks and spaces formed.

However, as an optical disc is a removable information recording medium, probably there will be some defect on its recording layer due to the presence of dust or a scratch. Among other things, the higher the density of a recording medium, the more easily the recording medium will be affected by defects. That is why it has become a more and more common measure to take to carry out a defect management on not just rewritable optical discs (such as a BD-RE) but also write-once optical discs (such as a BD-R) as well to ensure the reliability of the data read or written (see Patent Document No. 1 (Japanese Patent Application Laid-Open Publication No. 2005-56542), for example). Furthermore, a BD-R is characterized by having not only a sequential recording mode in which a write operation is carried out sequentially from a particular recording start point, as is typical of write-once storage media, but also a random recording mode as well, in which a write operation is performed on an arbitrary recording point (see Patent Document No. 2 (Japanese Patent Publication No. 3861856), No. 3 (U.S. Pat. No. 7,188, 271) and #4 (United States Patent Application Publication No. 2007/0122124), for example).

FIG. 1 illustrates a normal layout of various areas on an optical disc. The disklike optical disc 1 has a spiral track 2, along which a great many subdivided blocks 3 are arranged. Blocks 3 are not only units of error correction but also the smallest units of read/write operations. Each block 3 is called sometimes a "cluster" as for BDs and sometimes an "ECC" as for DVDs. One cluster, which constitutes one block for a BD, is equal to 32 sectors (i.e., one sector has a size of 2 kilobytes and one cluster has a size of 64 kilobytes). On the other hand, one ECC, which constitutes one block for a DVD, is equal to 16 sectors (i.e., 32 kilobytes). Also, the storage area on the optical disc 1 is roughly classified into a lead-in area 4, a data area 5 and a lead-out area 6. User data is supposed to be read from, and written on, the data area 5. The lead-in area 4 and the lead-out area 6 function as margins that allow the optical head (not shown) to get back on tracks even if the optical head has overrun while accessing an end portion of the data area 5. That is to say, these areas 4 and 6 function as "rims" so to speak. Such a layout of areas is used commonly on both a rewritable optical disc and a write-once optical disc.

FIG. 2 shows the data structure of a single recording layer of a conventional write-once optical disc with a defect management function.

The data area 5 is made up of a user data area 14, from/on which user data is read or written, and spare areas, each of which is defined in advance to provide an alternative block (which will be referred to herein as a "replacement block") for a defective block, if any, in the user data area 14. In the example illustrated in FIG. 2, an inner spare area 15 is arranged closer to the inner edge of the optical disc 1, and an outer spare area 16 is arranged closer to its outer edge. That is to say, although one spare area is arranged inside of the data area 5 and another spare area is arranged outside of the data area 5 in FIG. 2, the spare area could be provided on only one of these two sides (e.g., only inside of the data area 5). Therefore, the arrangement shown in FIG. 2 does not always have to be adopted.

Each of the lead-in and lead-out areas 4 and 6 has areas to store a disc management structure (which will be abbreviated herein as "DMS") that provides pieces of management information about the arrangement (or size) of the spare areas on the optical disc 1, the recording mode, defective blocks and so on. Specifically, the lead-in area 4 includes first and second disc management areas (DMAs) 10 and 11 (which will be referred to herein as "DMA #1" and "DMA #2", respectively). On the other hand, the lead-out area 6 includes third and fourth DMAs 12 and 13 (which will be referred to herein as "DMA #3" and "DMA #4", respectively). It should be noted that DMA sometimes stands for a defect management area.

DMA #1 through #4 are arranged in their own areas and store quite the same pieces of management information except some predetermined kind of information such as location information, which is done to prepare for a situation where any of the DMA #1 through #4 has gone defective itself. That is to say, even if information can no longer be retrieved from one of these four DMAs properly, the defect management information can still be acquired as long as there is at least one DMA from which information can be retrieved properly.

The lead-in area 4 further has a first TDMA (temporary disc management area) 17. The TDMA is an area unique to a write-once optical disc which is a non-rewritable (i.e., non-updatable) disc and is used to add temporary management information and update it while the optical disc 1 is being used. It should be noted that TDMA sometimes stands for a temporary defect management area.

Hereinafter, it will be described with reference to FIG. 14 exactly how to use the TDMA 17. First of all, initialization formatting processing (which is also called simply "initialization") is carried out so that the write-once optical disc 1 gets ready to be used by determining the arrangement (or size) of the spare areas and the recording mode, thereby recording initial TDMS (temporary disc management structure) 20 as shown in portion (a) of FIG. 14.

Next, as shown in portion (b) of FIG. 14, write processing is performed on the user data area 14 and TDMS #0 21, of which the information (such as defect information and recording end point information) has been updated as a result of the write processing, is written at the top of the unrecorded area of the TDMA 17 (i.e., so as to consume the unrecorded area to the right from the boundary between the recorded area and the unrecorded area).

After that, the management information will be updated in the same way a number of times. And portion (c) of FIG. 14 illustrates a state in which the management information has been updated (m+1) times since the initialization formatting processing was done. That is to say, the latest piece of management information (i.e., the latest TDMS) will be the recorded TDMS (i.e., TDMS #m 21 in FIG. 14) that is adjacent to the boundary between the recorded and unrecorded areas of the TDMA 17.

The arrangement of the DMAs is not different between a write-once optical disc and a rewritable optical disc. However, since the rewritable optical disc is rewritable (i.e., updatable), every piece of management information, including the temporary management information while the optical disc 1 is being used, can be updated in these DMA areas. On the other hand, the write-once optical disc is not rewritable (i.e., non-updatable). That is why the write-once optical disc 1 has an area called "TDMA" for updating temporary information, which cannot be found in any disc other than write-once ones. And when finalize (also called "disc close") processing is carried out to prohibit the user from newly adding any further piece of information to the optical disc 1 and make the disc a read-only one, the contents of the latest TDMS are copied onto the DMA.

In the example illustrated in FIG. 2, only one TDMA 17 is supposed to be arranged in the lead-in area 4. However, two or more TDMAs 17 could be arranged (see Patent Document No. 5 (Japanese Patent Publication No. 3865261, for example). Optionally, multiple TDMAs may also be provided for each recording layer and arranged in the spare areas, too. For instance, as shown in FIG. 15, additional TDMA #1 and TDMA#2 may be respectively provided for the inner and outer spare areas 15 and 16 of the data area 5, in addition to TDMA #0 in the lead-in area 4. Also, if the write-once optical disc 1 has multiple recording layers, those TDMA areas may be provided for each of those multiple recording layers.

The DMS written on the DMAs and the TDMS 21 written on the TDMA 17 are both made up of the same elements. In the following description, the TDMS 21 will be described as an example.

FIG. 16 illustrates elements that form a TDMS 21 on a BD-R, which is a write-once optical disc, in the random recording mode. In FIG. 16, the structure of a write-once optical disc 1 with only one recording layer is shown as an example. That is why the data that each of these pieces of information contains is supposed to be provided for just one recording layer in the example illustrated in FIG. 16.

The TDMS 21 consists of an SBM (space bitmap) 30, a TDFL (temporary defect list) 31 and TDDS (temporary disc definition structure) 32.

The SBM 30 has an SBM header 40 including an identifier disclosing its identify as the SBM 30, information about the number of times of update, and information about the range of the SBM area to manage (e.g., the top address and size of the area in question), and bitmap information 41 indicating the recording statuses (e.g., recorded and unrecorded states) in that range of the SBM area to manage. The bitmap information 41 will be described in further detail later. In an optical disc 1 with multiple recording layers, the data areas 5 on which the SBM 30 can be managed (more specifically, the user data area 14) are not physically continuous with each other between its multiple recording layers, and therefore, the SBM 30 is provided for each of those recording layers.

The TDFL 31 has: a DFL header 42 including an identifier disclosing its identity as the TDFL, information about the number of times of update, and information about the number of DFL entries 43 (e.g., n+1 in FIG. 16), which is defect and replacement information of the TDFL; that number of DFL entries 43; and a DFL terminator 44 including an identifier disclosing its identity as the terminal position of the TDFL 31, of which the size is variable according to the number of DFL entries 43, and information about the number of times of update. The TDFL 31 and the TDDS 32 of one sector size (to be described later) may have a size of at most four blocks (i.e., four clusters as for a BD) combined if there is only one recording layer and may have a size of at most eight blocks (i.e., eight clusters as for a BD) combined if there are two recording layers. That is to say, the size of the TDFL 31 itself is supposed to be at most "four blocks (i.e., four clusters as for a BD) minus one sector" if there is only one recording layer but at most "eight blocks (i.e., eight clusters as for a BD) minus one sector" if there are two recording layers.

The TDDS 32 has: a DDS header 50 including an identifier disclosing its identity as the TDDS 32 and information about the number of times of update; an inner spare area size 51 and an outer spare area size 52, which are pieces of information about the respective sizes of the inner and outer spare areas 15 and 16 that determine the layout of the respective areas in the data area 5; recording mode information 53 indicating whether the recording mode is sequential recording mode or random recording mode; inner spare area TDMA size 54 and an outer spare area TDMA size 55 providing size information in a situation where there are TDMAs in the inner and outer spare areas 15 and 16 as shown in FIG. 15; SBM #0 location information 56, which is information about the storage location of the latest SBM 30; and DFL #0 location information 57, DFL #1 location information 58, DFL #2 location information 59, and DFL #3 location information 60, which are pieces of location information of the respective blocks in which the latest TDFL 31 (of at most four blocks) is stored.

The TDDS 32 has a fixed size, e.g., a size of one sector as described above.

Hereinafter, the bitmap information 41 will be described in detail with reference to FIG. 19. The bitmap information 41 is a piece of information for use to check recorded and unrecorded portions of a data area on a block-by-block basis, for example. In the bitmap information 41, one block of a given area range, of which the SBM needs to be managed (e.g., the user data area 14), is associated with one bit, the status of that block is indicated to be zero if it is still an unrecorded block, but its status is changed into one when the block turns into a recorded one. That is to say, supposing the eight blocks A through H in the given area range, of which the SBM needs to be managed, get associated with bits 0 through 7, respectively, in the one-byte (i.e., eight-bit) data at a predetermined byte position in the bitmap information 41 as shown in FIG. 19, if the entire area of interest is unrecorded as shown in FIG. 19(A), every bit (i.e., from bit 0 through bit 7) of the bitmap information 41 will be zero. On the other hand, after a write operation has been performed on the blocks B, C and F, their associated bits 1, 2 and 5 of the bitmap information 41 will become one and the one-byte (i.e., eight-bit) data at the predetermined byte position of the bitmap information 41 will be 26h, which is a hexadecimal number as shown in FIG. 19(B). Since one block is associated with one bit, 4000h (which is a hexadecimal, too) blocks can be managed using one sector (2 kilobytes) of bitmap information 41 and 78000h (which is also a hexadecimal and which is 491,520 according to decimal notation) blocks can be managed using 30 sectors of bitmap information 41.

As for a BD-R, if the maximum capacity per recording layer is 27 gigabytes, the maximum number of blocks (or clusters) included in the user data area 14 is less than 68000h (which is again a hexadecimal). That is why it should be enough if the bitmap information 41 has a size of 30 sectors. As a result, supposing the SBM header 40 has a size of one sector, it is possible to ensure that the combined size of the SBM 30 with a size of 31 sectors and the TDDS 32 with a size of one sector is always equal to or smaller than one block (i.e., 32 sectors or one cluster). On the other hand, as the size of the TDFL 31 is variable according to the number of DFL entries 43, it is impossible to ensure that the combined size of the TDFL 31 and the TDDS 32 is always equal to or smaller than one block.

Each of the SBM 30 and the TDFL 31 is always written on the TDMA 17 using its combination with the TDDS 32 as a single recording unit (which is called a "disc management structure update unit").

Next, the initial TOMS 20 (see FIG. 14) will be described.

The initial TDMS 20 is arranged at the top of the TDMA 17 (i.e., at the position to be used (recorded) earliest on the optical disc 1).

The initial TDMS 20 has the same elements as, but slightly different contents from, a normal TDMS 21. As shown in FIG. 17, the initial TDMS 20 includes one block (i.e., one cluster) of data as a combination of the initial SBM 30 and the TDDS 32 that form one disc management structure update unit, and another block (i.e., another cluster) of data as a combination of the initial TDFL 31 and the TDDS 32 that form another disc management structure update unit.

As used herein, the "initial SBM 30" refers to an SBM, for which only information about the identifier of its SBM header 40 and the area range of the SBM to be managed are defined and information about the number of times of its updates and the bitmap information 41 are all zero (i.e., the user data area 14 is totally unrecorded).

Also, the TDDS 32 to be written in combination with the initial SBM 30 not just includes the DDS header 50 providing only identifier information but also defines the sizes of the respective spare areas (i.e., the inner and outer spare area sizes 51 and 52), the sizes of the TDMAs in those spare areas (i.e., inner- and outer-spare-area TDMA sizes 54 and 55) and recording mode information 53 (e.g., random recording mode in this example). Furthermore, information about the location at which the SBM 30 is going to be written is stored as the SBM #0 location information 56. DFL #0 location information 57 corresponding to the initial TDFL 31 to be described later is stored as the TDFL location information, and indicates the block location on which the initial TDFL 31 and TDDS 32 are written next to the initial SBM 30 and the TDDS 32.

As for the DFL #1, #2 and #3 location information 58, 59 and 60 not to be used, null data (e.g., zero) indicating that these pieces of information are not available may be written, for example.

Also, the initial TDFL 31 refers to a TDFL of the minimum size including no DFL entries 43 at all, i.e., the TDFL includes only the DFL header 42 (which provides only identifier information, but of which the number of DFL entries 43 and information about the number of times of updates are both zero) and the DFL terminator 44 (for which identifier information has been defined but of which the number of times of update information is zero). Since the initial TDFL 31 has a size that is equal to or smaller than one sector size, the combined size will be equal to or smaller than one block (or cluster) size even when written in combination with the TDDS 32. Furthermore, the TDDS 32 to be written in this case may have almost the same data as what is written as the initial SBM 30 and TDDS 32 described above. It is only the DFL #0 location information 57 that can be different. That is to say, if data cannot be written on an intended block due to the presence of a defect, for example, but has been written on the next block instead, for example, only this value can be different from the value of the TDDS 32 that has been written with the initial SBM 30.

As described above, at the top of the TDMA 17, stored is a portion of the data of the initial TDMS 20. In addition, at that top location, always written is a TDDS 32 that provides information that clearly indicates the area arrangement and recording mode of the data area 5 on the optical disc 1. Thus, even if it is impossible to decide, on the spot, exactly where such a TDDS 32, providing information that indicates the area arrangement and recording mode of the data area 5 on the optical disc 1, is located (e.g., if there are a number of TDMAs or if the TDMA has already been updated a number of times), the area arrangement and recording mode of the data area 5 can still be determined definitely by reading out the data from one block at the top of the TDMA 17 (or the first one of its following blocks on which a read/write operation can be performed properly if it is a defective block).

Particularly, in a situation where a read-only apparatus for the optical disc 1 is loaded with an optical disc 1 with no spare areas, as long as at least the layout (i.e., area arrangement) of the optical disc 1 is known, that apparatus can also perform read processing at the read request issued by the host even without getting the latest management information. That is why the latest management information is not always required and the TDDS 32 indicating the layout of the optical disc 1 is preferably obtained as soon as possible and as securely as possible. Therefore, from that standpoint, it is also preferred that data that always has the TDDS 32 at a predetermined location (e.g., one block at the top of the TDMA 17) be written.

Furthermore, in a situation where there are multiple TDMAs, if the size information of the TDMA located on the spare area were not available, then even the location of that TDMA could not be determined. For that reason, it is very important and efficient for an optical disc drive to perform a read/write operation on this optical disc 1 that the data of the TDDS 32 is always arranged at a predetermined location (e.g., at the top of the TDMA 17 in this example).

In the foregoing example, a random recording mode has been described. In a sequential recording mode, on the other hand, SRRI (SRR information), providing information about the top location of recording tracks (which are also called an SRR (sequential recording range)) and information about the end location of the recorded portion, will just be written instead of the SBM 30. In that case, the initial TDMS consists of an initial TDFL 31, an initial SRRI and a TDDS 32, has a size that is equal to or smaller than one block (or one cluster) and therefore, written as one block (one cluster) data.

It should be noted that a DMS to be written on a DMA and a TDMS to be written on a TDMA have mutually different orders of data written and arranged. Specifically, in the TDMS, the TDDS is arranged at the end of the TDMS. In the DMS, on the other hand, the DDS is arranged at the top location of the DMS (see Patent Document No. 1 (Japanese Patent Publication No. 2005-56542).

Also, recently, people have been trying harder and harder to further increase the storage capacities of optical discs. Examples of those methods for realizing optical discs with huge capacities (i.e., methods for increasing their storage capacities) include increasing the storage density per recording layer by shorting the lengths of recording marks and spaces to be left or shortening the track pitch and increasing the overall storage capacity by providing multiple information recording layers.

Among these methods, according to the method for increasing the storage density per recording layer by shortening the lengths of the marks and spaces to be left, a storage density of 32 gigabytes or 33.4 gigabytes per recording layer, which is approximately 25% greater than the maximum size of 27 GB of conventional BDs, is expected to be realized. And even higher storage densities could be realized in the future, too.

SUMMARY OF THE INVENTION

However, if the storage capacity per recording layer increased, the sizes of the data area 5 and the user data area 14 to be managed using the SBM would naturally increase, too. As described above, 4000h (which is a hexadecimal number and which corresponds to 16,384 according to decimal notation) blocks can be managed with one sector of bitmap information 41. If the maximum size of the bitmap information 41 is 30 sectors, the number of manageable blocks will be 78000h (which is a hexadecimal number and which corresponds to 491,520 according to decimal notation). Supposing the storage capacity per recording layer increased to 33.4 gigabytes, for example, approximately 7D000h (which is a hexadecimal number and which corresponds to approximately 512,000 according to decimal notation) blocks would be needed per recording layer. To manage these blocks, however, 32 sectors, which are greater than 30 sectors as the maximum size of the bitmap information 41, would be needed. In that case, however, the combined size of the SBM 30 and the TDDS 32 would exceed one block (32 sectors).

Consequently, the size of one disc management structure update unit that is a combination of the SBM 30 and the TDDS 32 would also exceed one block (i.e., two blocks or more).

In such a situation, if the initial TDMS 20 were written in the conventional procedure so as to have the same contents as the conventional one, then the initial TDMS 20 would have the layout shown in FIG. 18. In that case, the data of the TDDS 32 could not always be arranged at the predetermined location (i.e., the top of the TDMA 17). In the example illustrated in FIG. 18, the TDDS 32 is located on the second block from the top. However, if a block of the TDMA 17 on which the initial TDMS 20 is going to be written were a defective block, for example, a write operation would be retried a number of times on the next block until the write operation gets done properly. That is why search should be done while checking out every block in order to locate a block with the proper TDDS 32.

Furthermore, in that case, the bitmap information 41 included in the SBM 30 to be written on the top block of the initial TDMS 20 would have any value that is meaningful bit by bit. For that reason, information about the identifier disclosing its identity as the TDDS 32 to be included in the DDS header 50 and the bitmap information 41 could happen to agree with each other. Consequently, it would be very difficult to search for the TDDS 32 on the properly written block 3.

It is therefore an object of the present invention to provide an information recording medium, of which the layout is determined so that data including the TDDS 32 can always be arranged at a predetermined location (e.g., at the top block of the TDMA 17) even if the size of management information such as the SBM 30 has increased as the storage capacity per recording layer increases, and also provide a method for performing a read/write operation on such an information recording medium.

A write-once information recording medium according to the present invention has at least one recording layer and information is written on a block-by-block basis on it. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information writing apparatus according to the present invention writes information on a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, the information writing apparatus generates multiple space bitmaps for the user data area of the predetermined recording layer, and writes a disc management structure update unit, including one of the multiple space bitmaps and the disc definition structure and having a size of one block, on the management information area.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information writing method according to the present invention is designed to write information on a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. The information writing method includes the steps of: if the size of the user data area on the predetermined recording layer exceeds a predetermined one, generating multiple space bitmaps for the user data area of the predetermined recording layer; and writing a disc management structure update unit, including one of the multiple space bitmaps and the disc definition structure and having a size of one block, on the management information area.

In one preferred embodiment, the method further includes the steps of: if the size of the user data area on the predetermined recording layer exceeds the predetermined size, dividing the bitmap information into multiple pieces of bitmap information; and associating one of those pieces of bitmap information with each of the multiple space bitmaps.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information reading apparatus according to the present invention reads information from a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area. And the information reading apparatus reads the disc management structure update unit, including the disc definition structure and having a size of one block, from the management information area and obtains the space bitmap.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information. And the information reading apparatus reads an associated piece of bitmap information from each space bitmap.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases, and the predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list. The initial defect list provides no information about a defective area. The information reading apparatus reads either the disc management structure update unit or the second disc management structure update unit from a block at the predetermined location.

In this particular preferred embodiment, the block at the predetermined location is located at the top of multiple readable and writable blocks in the management information area.

An information reading method according to the present invention is designed to read information from a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area. The information reading method includes the step of reading the disc management structure update unit, including the disc definition structure and having a size of one block, from the management information area and obtains the space bitmap.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information. The information reading method further includes the step of reading an associated piece of bitmap information from each space bitmap.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list. The initial defect list provides no information about a defective area. The information reading method includes the step of reading either the disc management structure update unit or the second disc management structure update unit from a block at the predetermined location in the management information area.

In this particular preferred embodiment, the block at the predetermined location is located at the top of multiple readable and writable blocks in the management information area.

According to the present invention, even if the storage capacity per recording layer has increased and if the size of management information about that recording layer has also increased, management information including a TDDS such as the layout information of a write-once information recording medium is always stored (or arranged) at a predetermined location (i.e., on the top block) in the management information area of the write-once information recording medium. Then, even for a read-only apparatus that does not always need the latest management information, the TDDS including the layout information of the write-once information recording medium can be obtained quickly and securely. As a result, faster response to a read instruction issued by a host device is realized.

Figure 5:
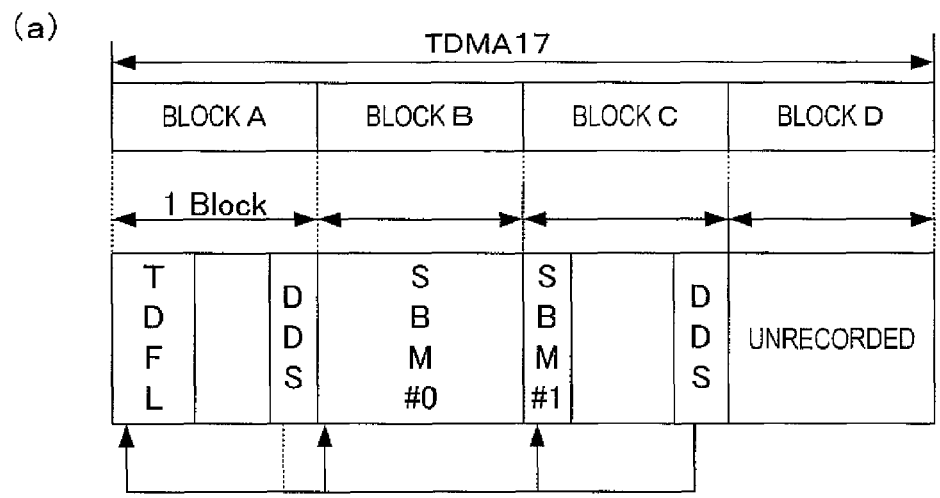
Figure 5:
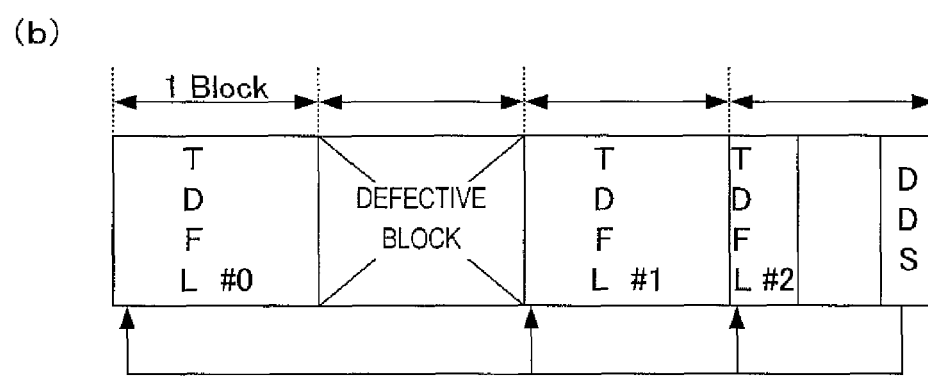
Figure 5:
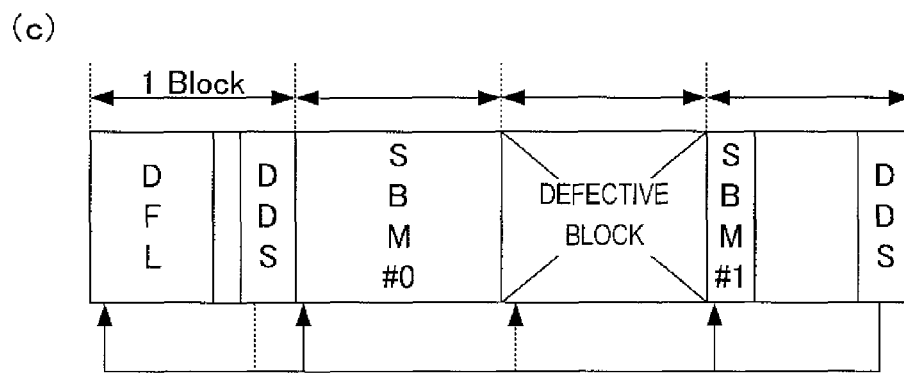

Portions (a) through (c) of FIG. 5 schematically illustrate how the TDMS is written and what location information is provided by a TDDS in the first preferred embodiment of the present invention.

Figure 6:
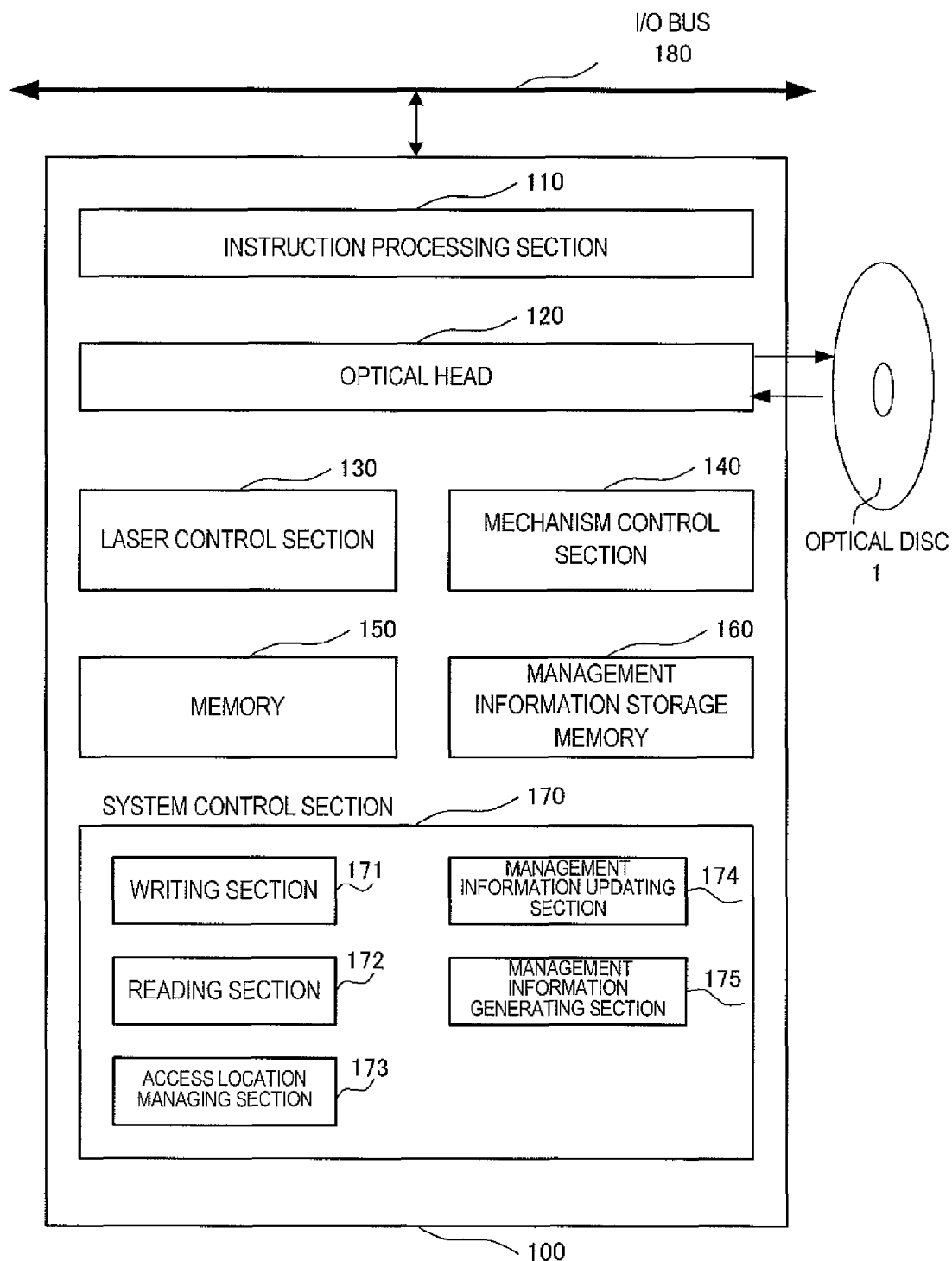

FIG. 6 is a block diagram illustrating an optical disc reading/writing apparatus for use in preferred embodiments of the present invention.

Figure 7:
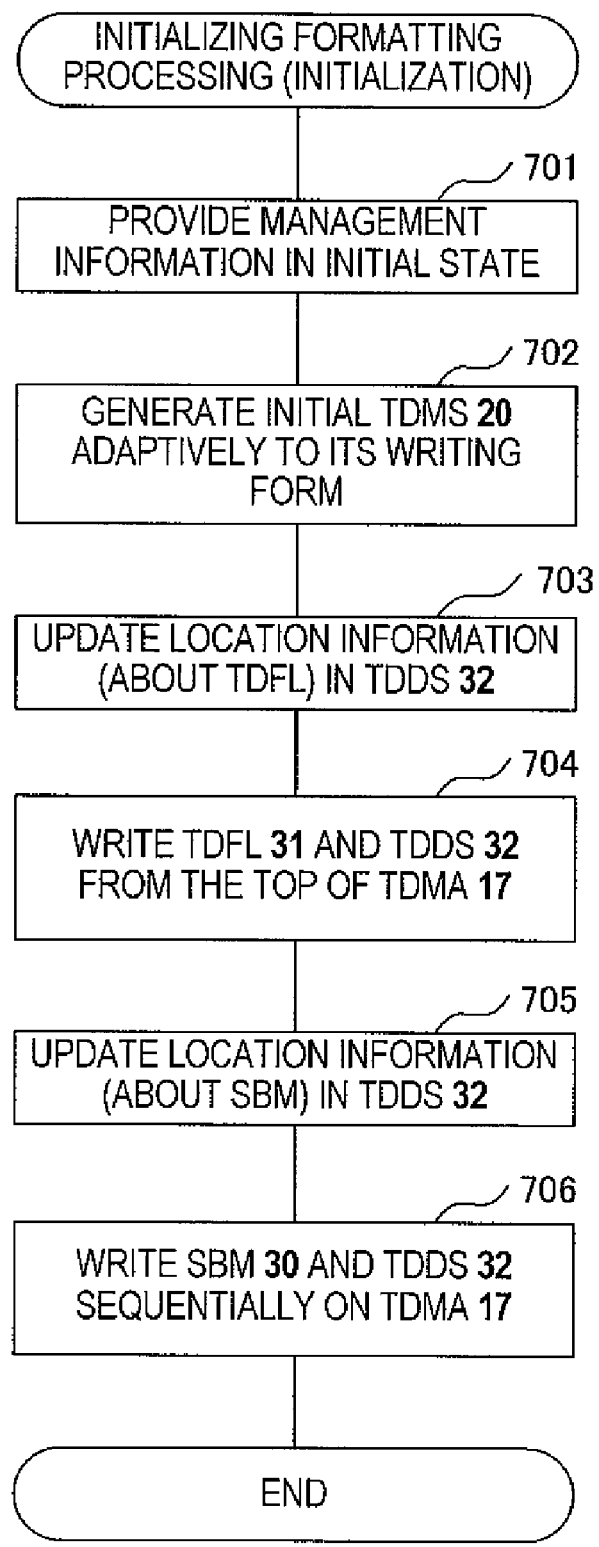

FIG. 7 is a flowchart showing how to get initializing formatting processing (i.e., initialization) done according to the first preferred embodiment of the present invention.

Figure 8:
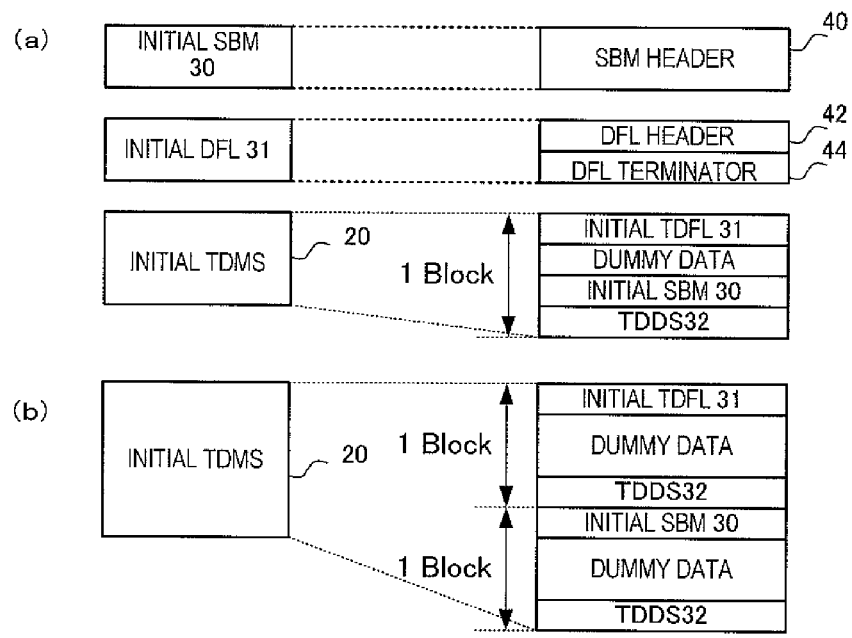

Portions (a) and (b) of FIG. 8 illustrate the data structure of an initial TDMS 20 according to a second specific preferred embodiment of the present invention.

Figure 9:
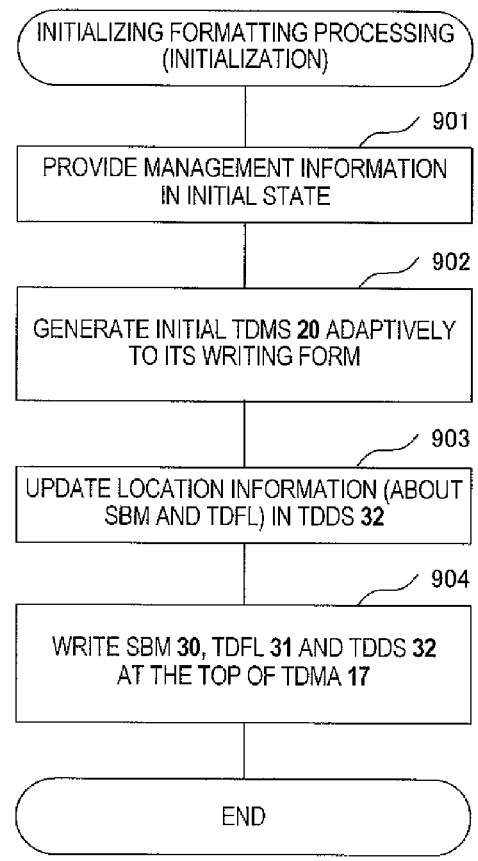

FIG. 9 is a flowchart showing how to get initializing formatting processing (i.e., initialization) done according to the second preferred embodiment of the present invention.

Figure 10:
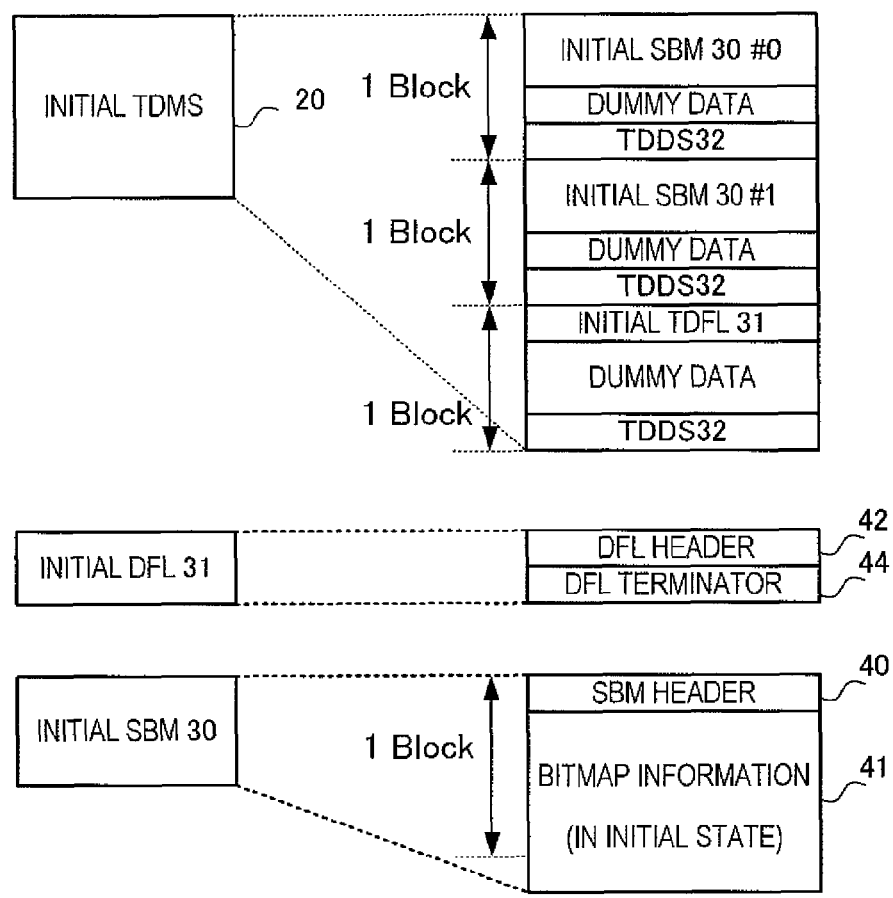

FIG. 10 illustrates the data structure of an initial TDMS according to a third specific preferred embodiment of the present invention.

Figure 11:
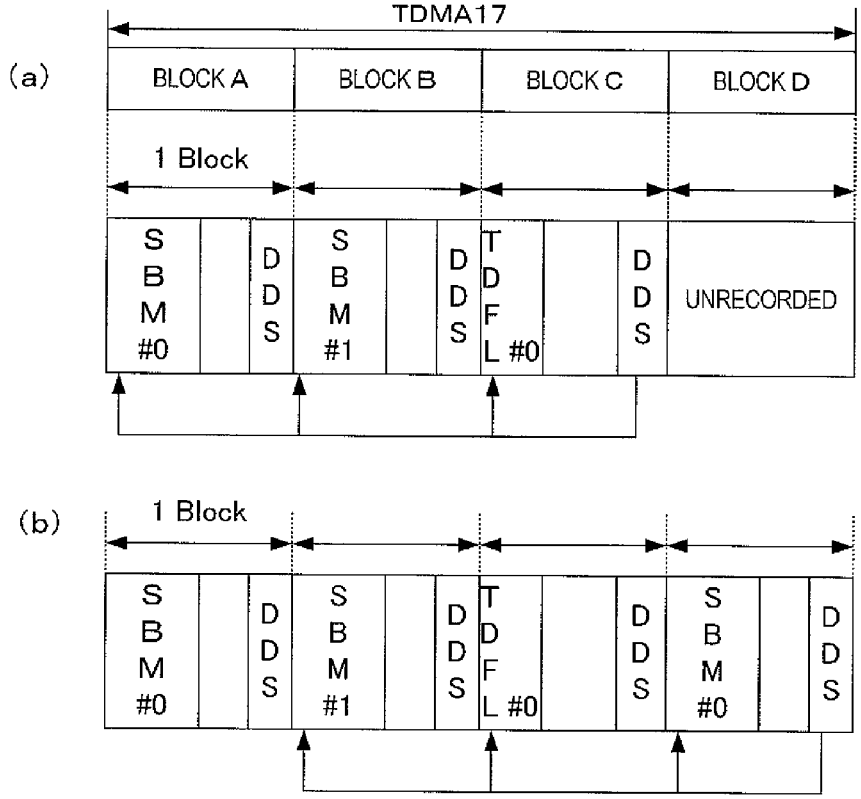

Portions (a) and (b) of FIG. 11 schematically illustrate how the TDMS is written and what location information is provided by the TDDS in the third preferred embodiment of the present invention.

Figure 12:
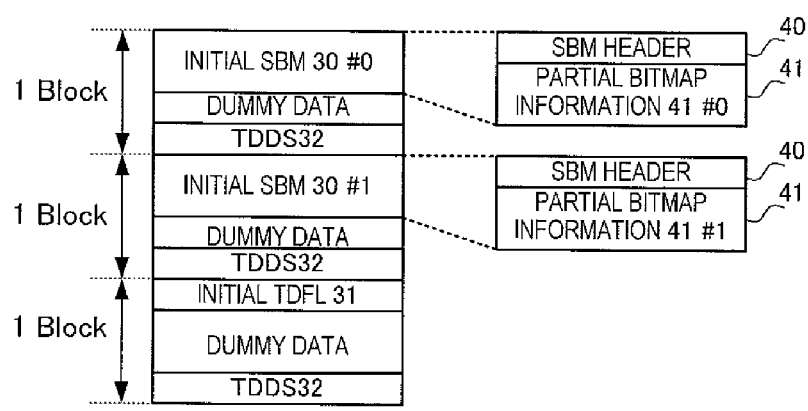

FIG. 12 illustrates the data structure of an initial SBM 30 according to the third preferred embodiment of the present invention.

Figure 13:
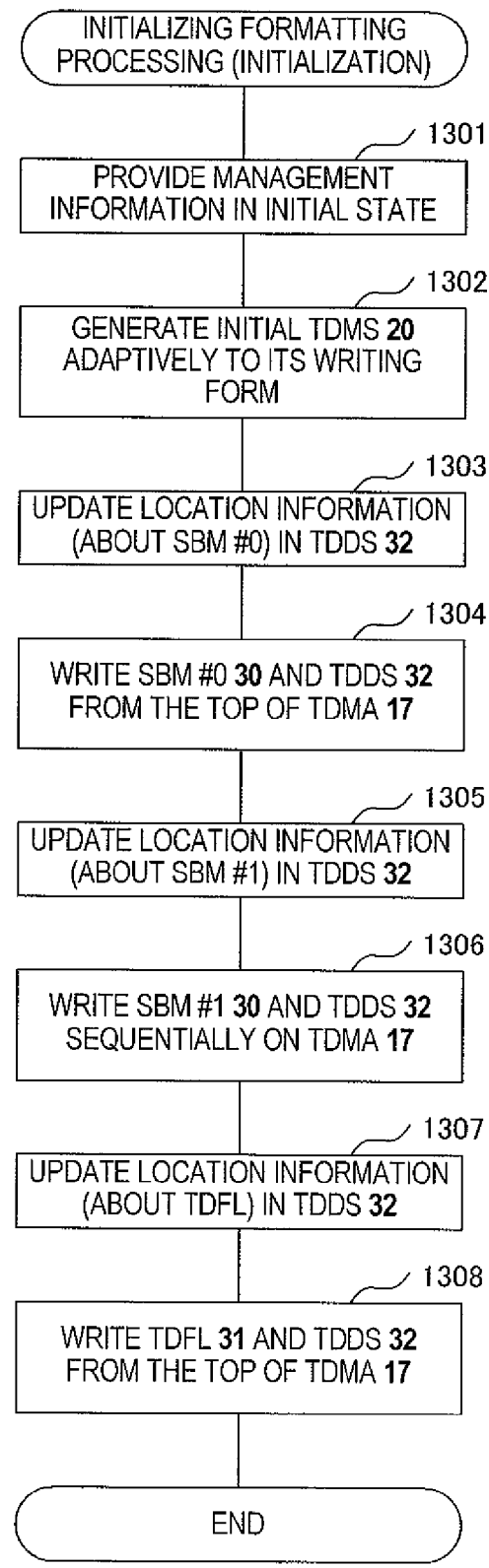

FIG. 13 is a flowchart showing how to get initializing formatting processing (i.e., initialization) done according to the third preferred embodiment of the present invention.

Figure 14:
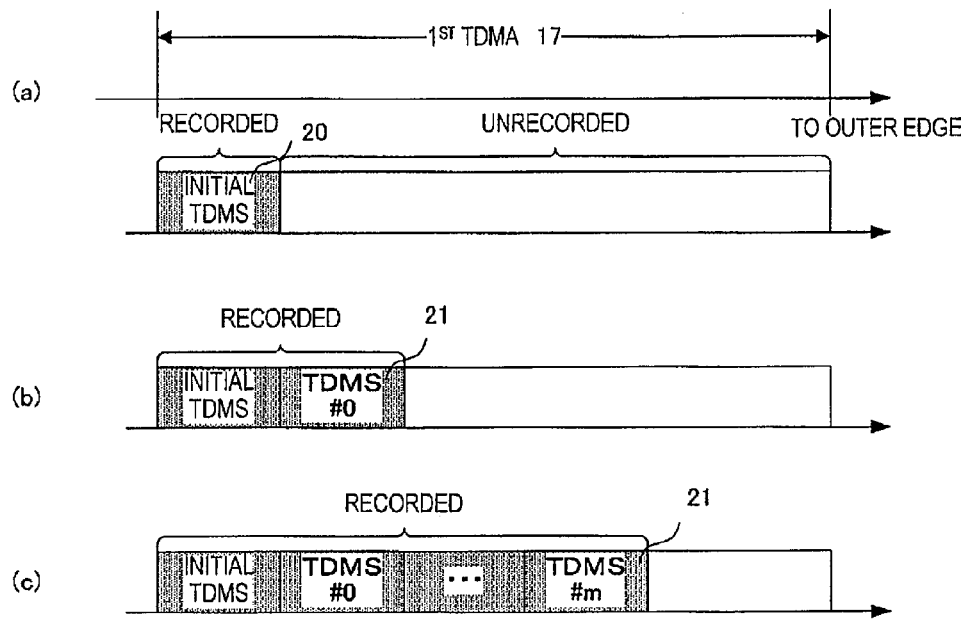

FIG. 14 illustrates how to update a TDMA.

Figure 15:
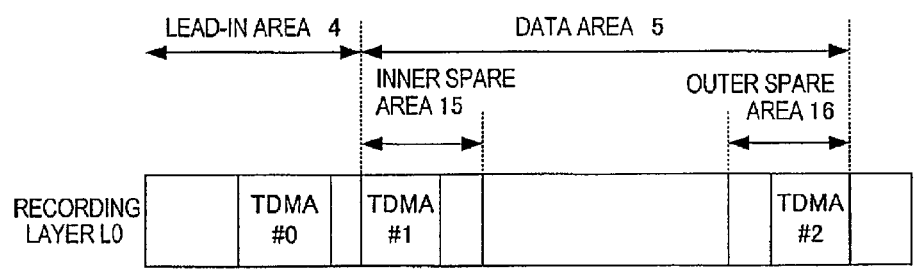

FIG. 15 illustrates how a number of TDMAs may be arranged on a recording layer.

Figure 16:
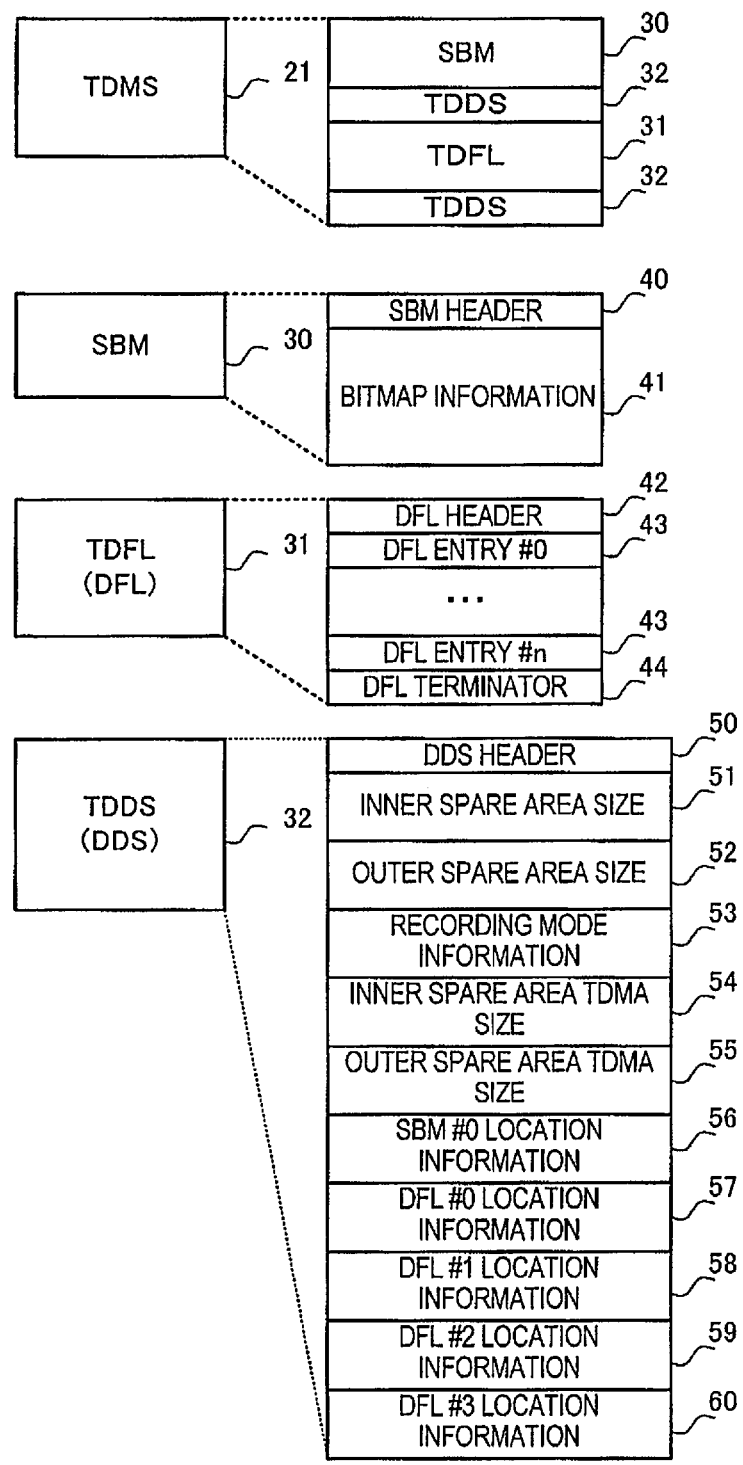

FIG. 16 illustrates what kinds of information are contained in a TDDS.

Figure 17:
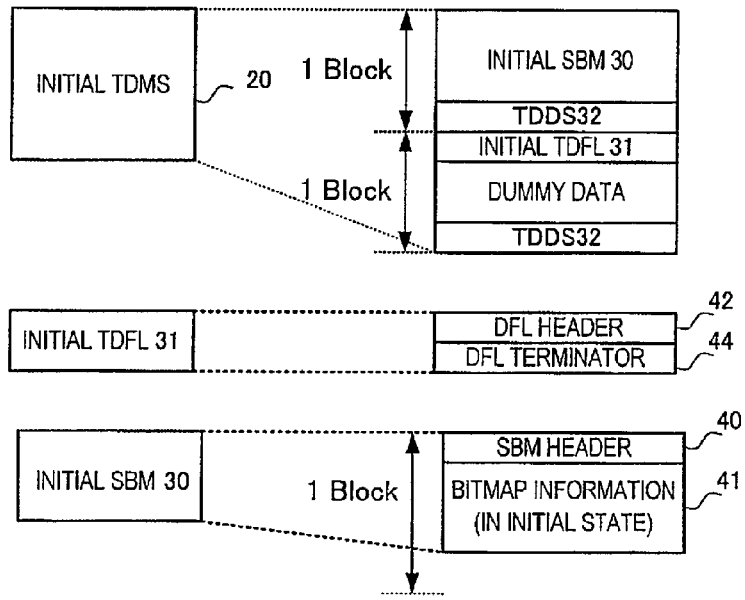

FIG. 17 illustrates the data structure of an initial TDMS 20.

Figure 18:
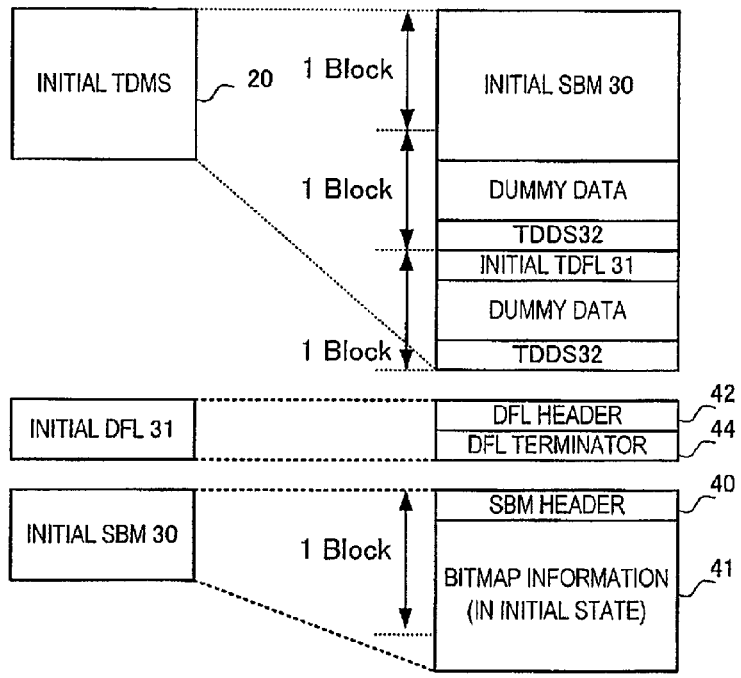

FIG. 18 illustrates the data structure of another initial TDMS 20.

Figure 19:
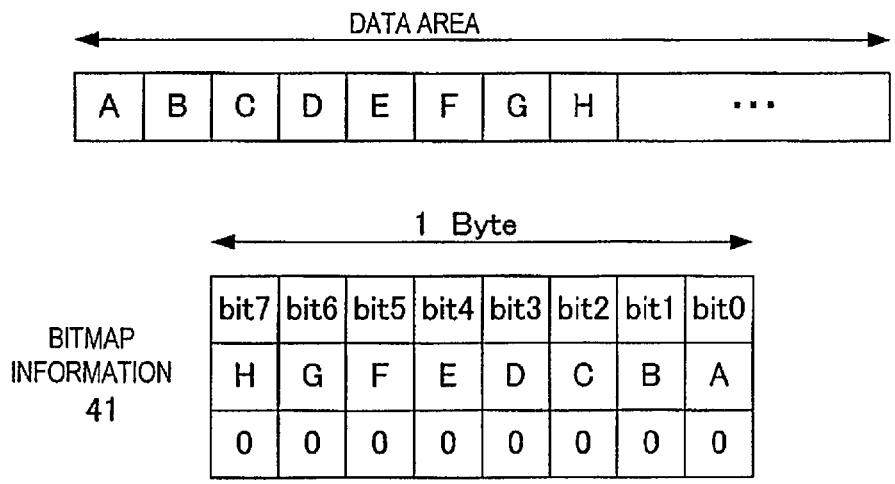
Figure 19:
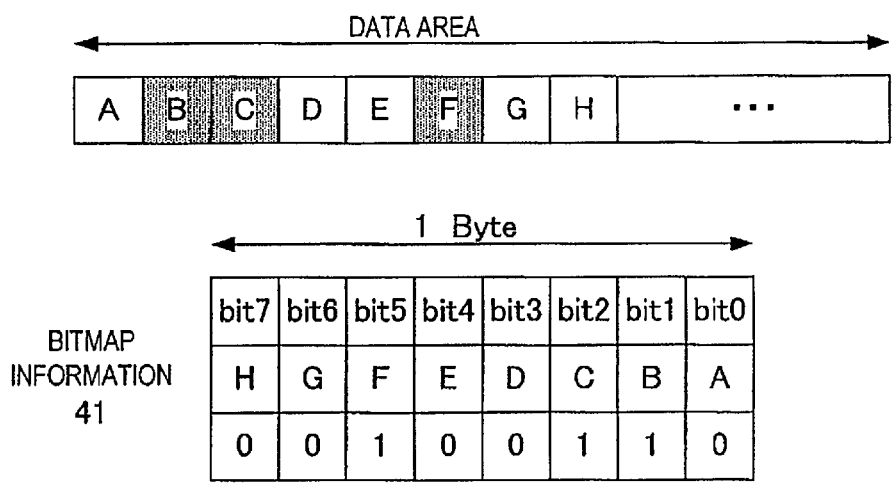

FIGS. 19(A) and 19(B) illustrate bitmap information.

Figure 20:
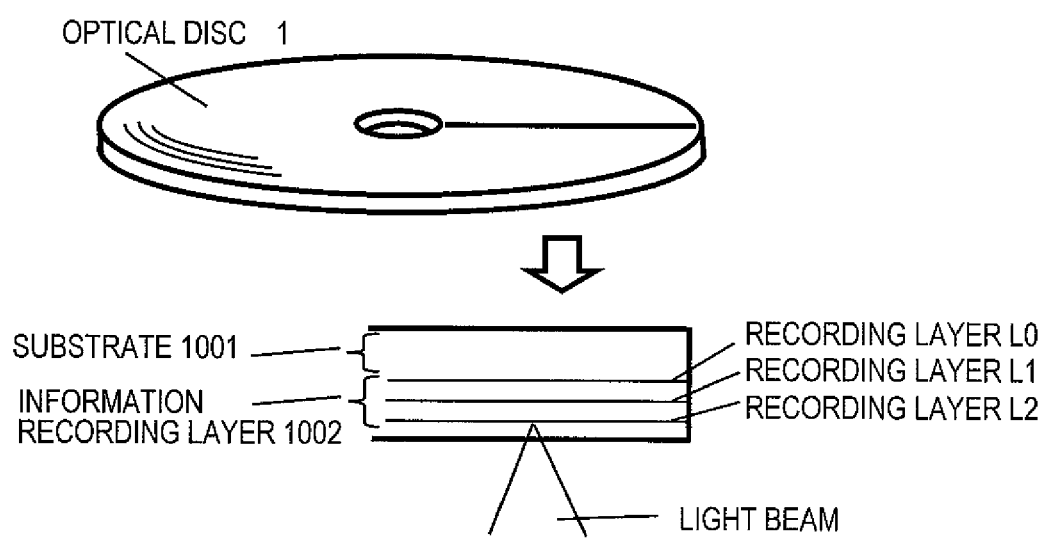

FIG. 20 illustrates a cross section of an optical disc as a specific preferred embodiment of the present invention.

Figure 21:
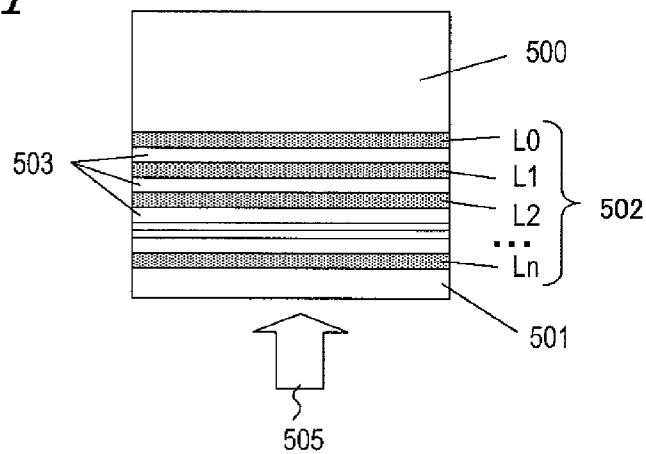

FIG. 21 illustrates the structure of a multilayer disc.

Figure 22:
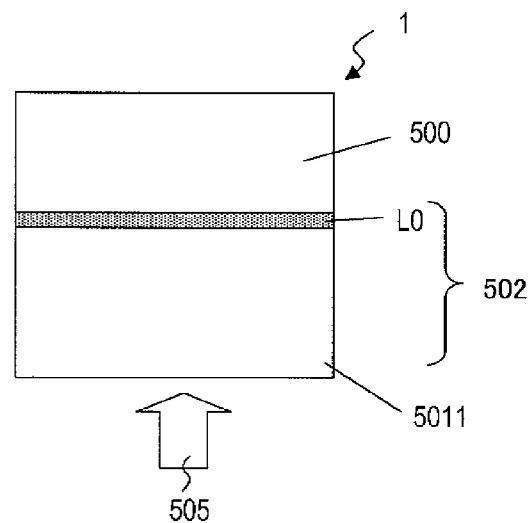

FIG. 22 illustrates the structure of a single-layer disc as a preferred embodiment of the present invention.

Figure 23:
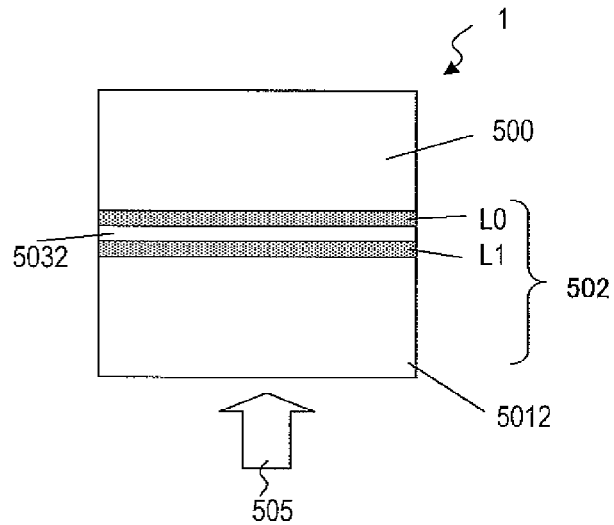

FIG. 23 illustrates the structure of a dual-layer disc as a preferred embodiment of the present invention.

Figure 24:
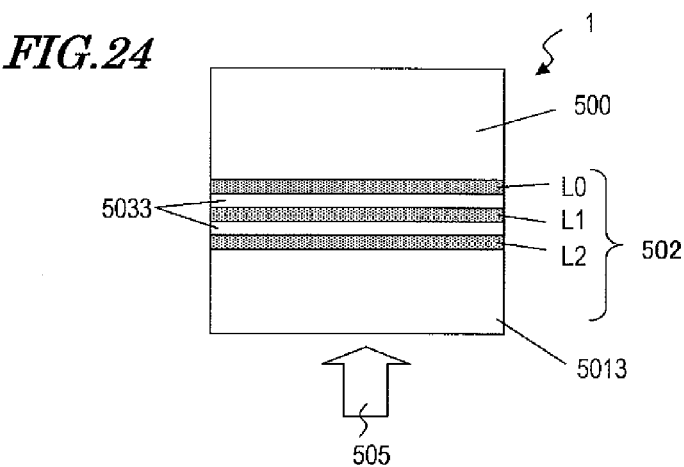

FIG. 24 illustrates the structure of a three-layer disc as a preferred embodiment of the present invention.

Figure 25:
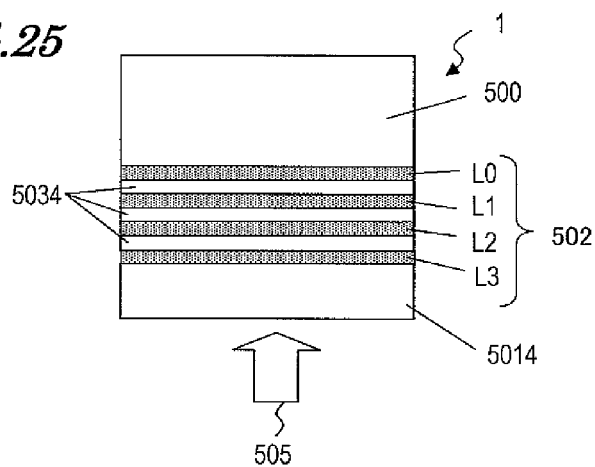

FIG. 25 illustrates the structure of a four-layer disc as a preferred embodiment of the present invention.

Figure 26:
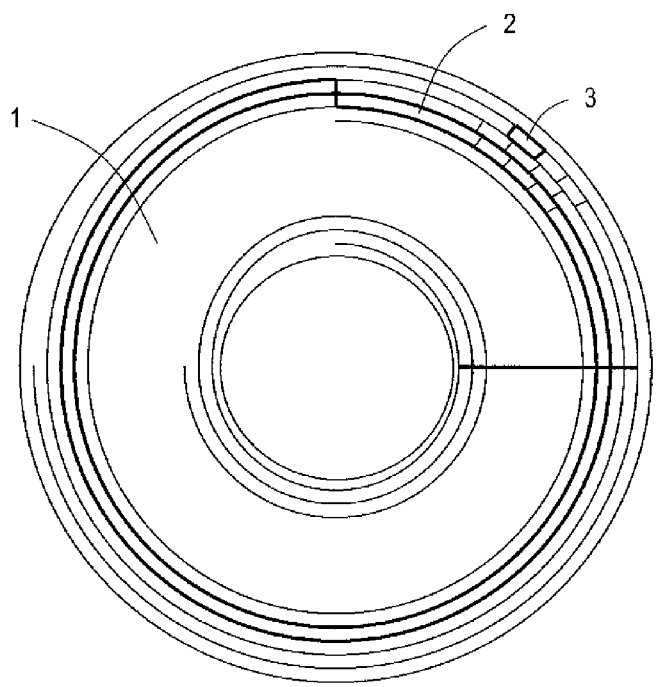

FIG. 26 illustrates the physical structure of an optical disc as a preferred embodiment of the present invention.

FIG. 27(A) illustrates an exemplary 25 GB BD and FIG. 27(B) illustrates an optical disc that has a higher storage density than the 25 GB BD.

Figure 28:
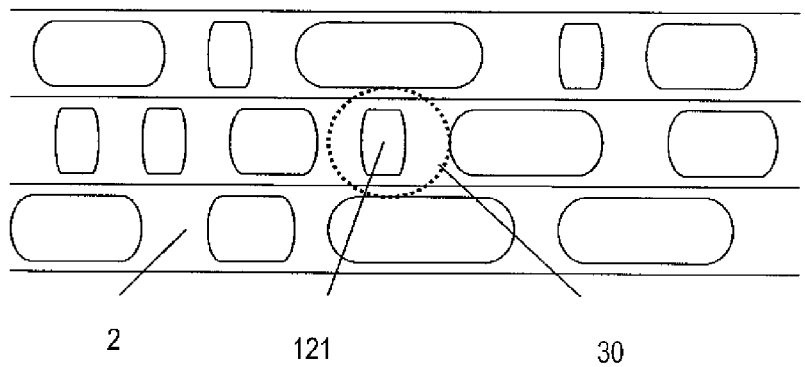

FIG. 28 illustrates how a series of recording marks on a track is irradiated with a light beam.

Figure 29:
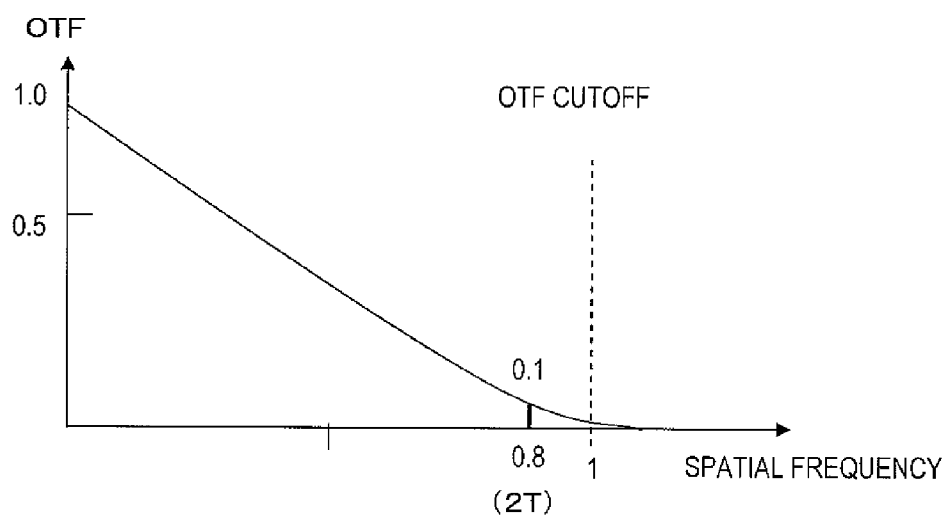

FIG. 29 is a graph showing how the OTF changes with the shortest recording mark on a disc with a storage capacity of 25 GB.

Figure 30:
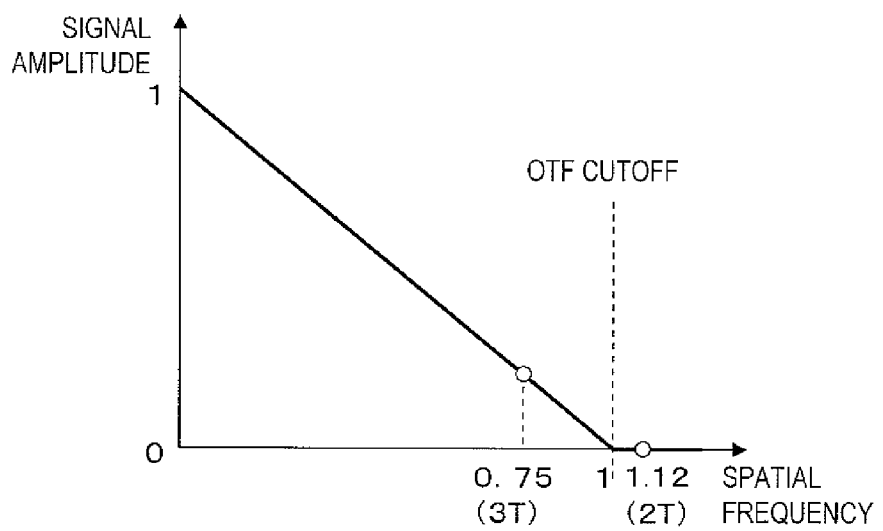

FIG. 30 shows an example in which the spatial frequency of the shortest mark (2T) is higher than an OTF cutoff frequency and in which a 2T read signal has an amplitude of zero.

DETAILED DESCRIPTION OF PREFERRED EMBODIMENTS

Hereinafter, preferred embodiments of the present invention will be described with reference to the accompanying drawings. In the following description of preferred embodiments of the present invention, the information recording medium is supposed to be a write-once information recording medium to which information can be added only once. It should be noted that the storage capacity of this recording medium per recording layer (i.e., the size of the user data area 14) is defined so that the SBM 30 has a size of at least one block (more specifically, the bitmap information 41 has a size of 31 sectors or more) and that the combined size of the SBM 30 and the TDDS 32 is more than one block.

Embodiment 1

(1) Area Arrangement

Figure 2:
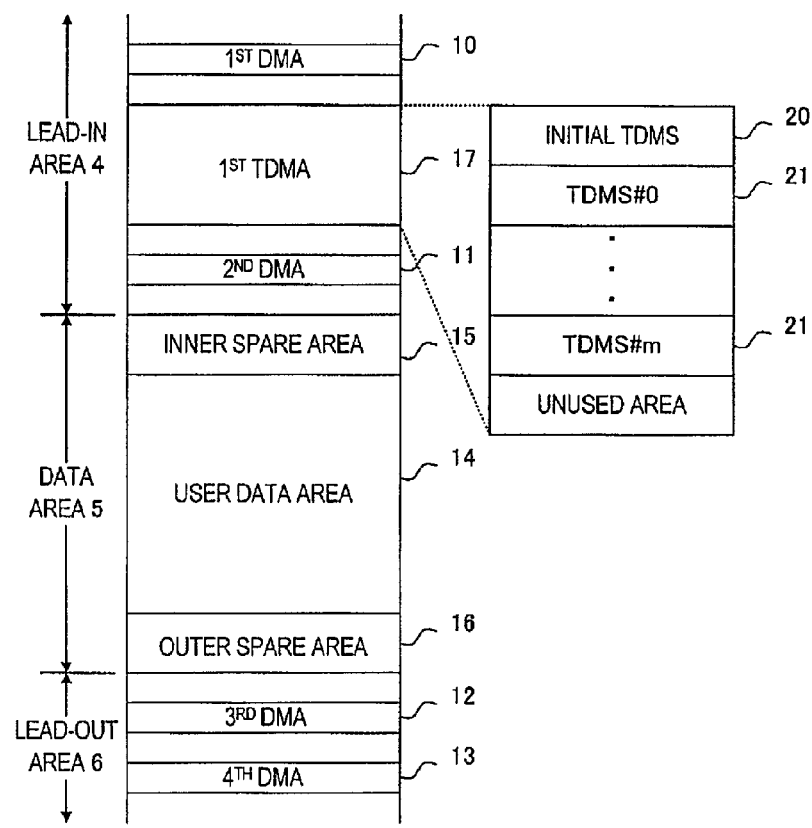
FIG. 2 illustrates the data structure of a recording layer of the optical disc according to the preferred embodiment of the present invention.

An optical disc 1 as a write-once information recording medium according to a first specific preferred embodiment of the present invention has the same area arrangement (or layout) as what has already been described with reference to FIG. 2.

(2) Data Arrangement of Initial TDMS 20

Figure 3:
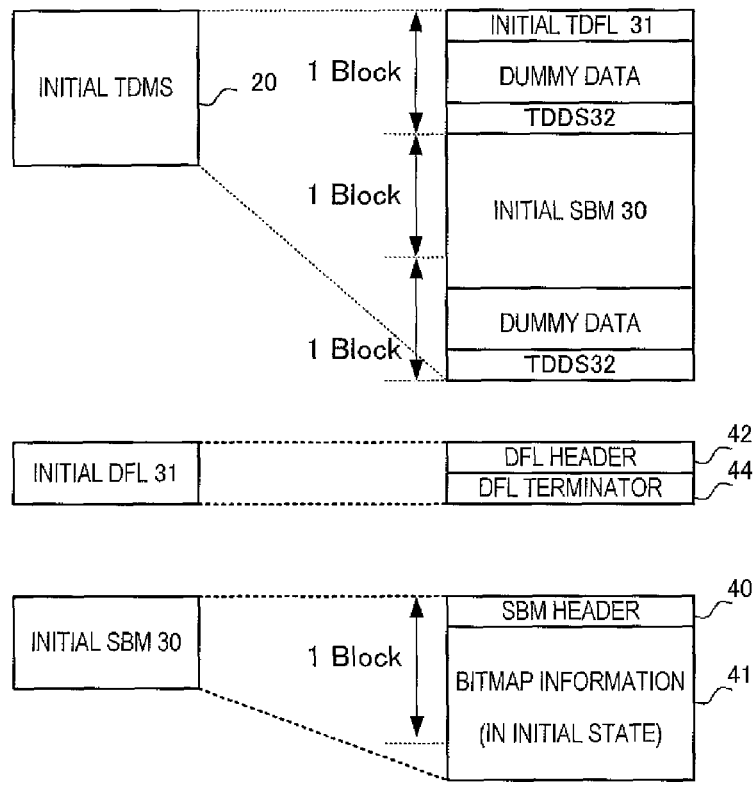
FIG. 3 illustrates the data structure of an initial TDMS according to a first specific preferred embodiment of the present invention.

FIG. 3 illustrates the data arrangement of an initial temporary disc management structure (TDMS) 20 that is written at the top of the temporary disc management area (TDMA) 17 (or the first one of multiple TDMAs) of the optical disc 1 according to the first preferred embodiment of the present invention.

As shown in FIG. 3, the initial TDMS 20 is made up of an initial space bitmap (SBM) 30, two temporary disc definition structures (TDDS) 32 and an initial temporary defect list (TDFL) 31. On each of the SBM 30 and the TDFL 31, a write operation is performed in combination with its associated TDDS (i.e., on the basis of a disc management structure update unit). The initial TDMS 20 shown in FIG. 3 consists of the same elements as, but has a different order of writing from, the initial TDMS shown in FIG. 17. Specifically, before data including the initial SBM 30 is written, one block (or one cluster) of data of the combination of the initial TDFL 31 and the TDDS 32 (i.e., a disc management structure update unit) is written (or arranged) at the top. After that, two blocks (or two clusters) of data of the combination of the initial SBM 30 and the TDDS 32 (i.e., disc management structure update units) are written (or arranged). It should be noted that when those three block units of data are generated in combination, meaningless data portions of those three blocks of the data may be either dummy data (all of which is zero) or padding data indicating its meaninglessness, thereby generating data with a size of one block.

With such an arrangement, even if the size of the SBM 30 increases with the storage capacity per recording layer so much that the size of the disc management structure update unit, i.e., the combined size of the SBM 30 and the TDDS 32, exceeds one block (i.e., two blocks or more), data including the TDDS 32 can always be arranged at the first block of the TDMA 17. And if that first block is a defective one, that data can be arranged at the first one of its following blocks on which a read/write operation can be performed properly.

It should be noted that the same effect would be achieved even if such a method is applied to a situation where the SBM 30 has a size of 31 sectors or less (i.e., a situation where the combined size of the SBM 30 and the TDDS 32 is equal to or smaller than one block).

The specific procedure of writing will be described later in Section (5).

(3) Various Kinds of Information Contained in TDDS 32

Figure 4:
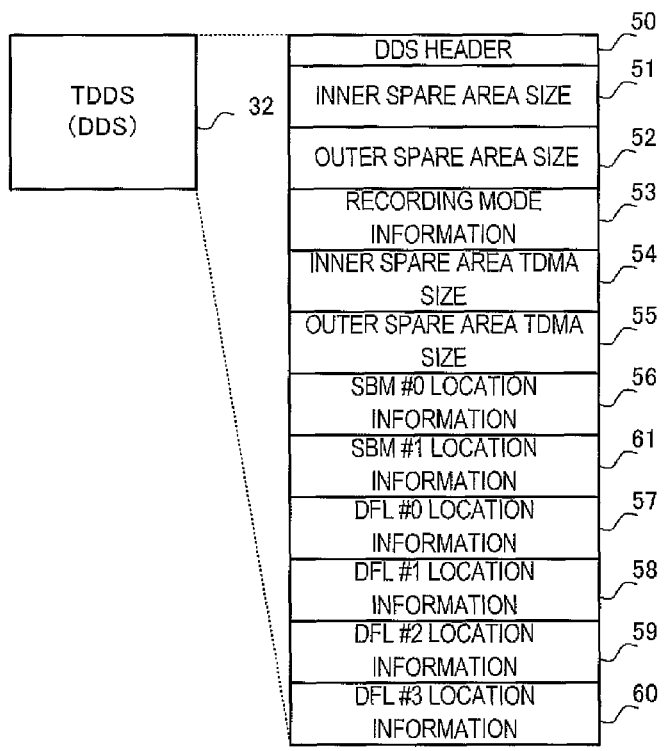
FIG. 4 illustrates what kinds of information are contained in the TDDS 32 according to a preferred embodiment of the present invention.

FIG. 4 illustrates the data structure of the TDDS 32 according to the first preferred embodiment of the present invention.

The TDDS 32 shown in FIG. 4 contains basically the same information as what has already been described with reference to FIG. 16 but further has SBM #1 location information 61 as well as the SBM #0 location information 56.

Specifically, the TDDS 32 shown in FIG. 4 includes: a DDS header 50 including an identifier disclosing its identity as the TDDS 32 and information about the number of times of update; an inner spare area size 51 and an outer spare area size 52, which are pieces of information about the respective sizes of the inner and outer spare areas 15 and 16 that determine the layout of the respective areas in the data area 5; recording mode information 53 indicating whether the recording mode is sequential recording mode or random recording mode; inner spare area TDMA size 54 and an outer spare area TDMA size 55 providing size information in a situation where there are TDMAs in the inner and outer spare areas 15 and 16 as shown in FIG. 15; DFL #0 location information 57, DFL #1 location information 58, DFL #2 location information 59, and DFL #3 location information 60, which are pieces of location information of the respective blocks in which the latest TDFL 31 (of at most four blocks) is stored; and SBM #0 location information 56 and SBM #1 location information 61, which are pieces of information about the storage location of the latest SBM 30. That is to say, as the SBM 30 has a size of two blocks, its location information also increases accordingly.

Hereinafter, it will be described in detail by way of specific examples why these pieces of location information (i.e., the location information of the TDFL 31 and that of the SBM 30) should be provided for respective blocks.

FIG. 5 schematically illustrates how the TDMS 21 (see FIG. 14) is written on the TDMA 17 and what location information is provided by the TDDS 32. In FIG. 5, four blocks A through D of the TDMA 17 will be taken as an example.

Portion (a) of FIG. 5 illustrates a situation where the combined data size of the TDFL 31 and the TDDS 32 is equal to or smaller than one block and a situation where the SBM 30 and the TDFL 31 are written at the same time (e.g., when the initial TDMS 20 is written).

On the first block A, written are the TDFL 31 and the TDDS 32. At this point in time, the DFL #0 location information of the TDDS 32 points to the top location of the block A on which the TDFL 31 is arranged. On the other hand, the SBM #0 location information 56 and the SBM #1 location information 61 are written so as to point to the respective top locations of the blocks B and C as their expected locations because these SBMs #0 and #1 have not been written yet.

Subsequently, the data of the SBMs 30 and the TDDS 32 is written over two consecutive blocks. At this point in time, the DFL #0 location information 57 of the TDDS 32 also points to the top location of the block A on which the TDFL 31 is arranged just like the TDDS 32 described above. On the other hand, the SBM #0 location information 56 and the SBM #1 location information 61 are also written so as to point to the respective top locations of the blocks B and C that are locations on which these SBMs #0 and #1 have actually been written.

That is to say, in this example, both of the two TDDS's 32 to be written have the same location information.

Portion (b) of FIG. 5 illustrates a situation where the TDFL 31 has a size of more than two blocks and where block B to be written is a defective one. As the TDFL 31 and the TDDS 32 have a combined size of three blocks, the data of the first block (TDFL #0) is written on block A. However, as the next block B is a defective block, the data of the second block (TDFL #1) is written on the block C that follows the defective one. And then the rest of the data (i.e., the data of TDFL #2 and TDDS 32 that has a combined size of one block) is written on block D. In that case, the DFL #0 location information 57 points to the top location of the block A, the DFL #1 location information 58 points to the top location of the block C, and the DFL #2 location information 59 points to the top location of the block D, as indicated by the solid arrows in FIG. 5.

As in portion (a) of FIG. 5, portion (c) of FIG. 5 also illustrates a situation where the combined data size of the TDFL 31 and the TDDS 32 is equal to or smaller than one block, where the SBM 30 and the TDFL 31 are written at the same time, and where block C to be written is a defective one. On the first block A, written are the TDFL 31 and the TDDS 32. At this point in time, the DFL #0 location information of the TDDS 32 points to the top location of the block A on which the TDFL 31 is arranged. On the other hand, the SBM #0 location information 56 and the SBM #1 location information 61 are written so as to point to the respective top locations of the blocks B and C as their expected locations because these SBMs #0 and #1 have not been written yet as indicated by the dotted arrows in FIG. 5.

Subsequently, the data of the SBMs 30 and the TDDS 32 is written over two blocks. In this case, the SBM #0 can be written properly on the block B but the write operation on the block C fails because that block C is a defective one. Thus, the data of the SBM #1 and the TDDS 32 that has a combined size of one block is written on the block D that follows the defective one.

At this point in time, the respective pieces of location information of the TDDS 32 point to the following locations. Specifically, the DFL #0 location information 57 points to the top location of the block A on which the TDFL 31 is arranged just like the TDDS 32 described above. On the other hand, the SBM #0 location information 56 and the SBM #1 location information 61 point to the respective locations on which these SBMs #0 and #1 have actually been written as indicated by the solid arrows in FIG. 5. That is to say, although the SBM #0 location information 56 points to the block B, the SBM #1 location information 61 points to the top location of the block D contrary to its location expected from the TDDS 32 that has been written on the block A.

That is to say, in this example, the two TDDS 32 to be written have partially different contents but correct information is always written on the newest TDDS 32 (i.e., the TDDS 32 written on the block D in the example illustrated in portion (c) of FIG. 5).

In the example described above, it is already known that the TDFL 31 and the SBMs 30 need to be written at the same time. In a situation such as the one shown in portion (c) of FIG. 5, however, the SBM #0 location information 56 and the SBM #1 location information 61 may be unchanged from their previous ones so as to point to the locations of the previous SBMs 30 that have been written properly. That is to say, by pointing to the previous locations at which the write operation has been done successfully instead of storing information about their expected locations, a wrong piece of location information will never be retrieved, no matter what TDDS 32 has been read.

In the example illustrated in portions (a) and (c) of FIG. 5, the writing order of the TDMS 21 is defined so that the TDFL 31 is written earlier than the SBMs 30. However, this order should be observed for at least the initial TDMS 20 of Section (2) described above. Thus, as for the TDMS 21, the SBMs 30 may be written earlier than the TDFL 31.

(4) Reading/Writing Apparatus

FIG. 6 illustrates a configuration for an optical disc reading/writing apparatus 100 for performing read and write operations on the optical disc 1 of this preferred embodiment of the present invention. This apparatus 100 may be either a recorder or a read-only apparatus.

The optical disc reading/writing apparatus 100 is connected to a high-order controller (not shown) through an I/O bus 180. The high-order controller may be a host computer (host PC), for example.

The optical disc reading/writing apparatus 100 includes: an instruction processing section 110 for processing instructions given by the high-order controller; an optical head 120 that irradiates the optical disc 1 with a laser beam to perform a read/write operation on it; a laser control section 130 for controlling the power of the laser beam that has been emitted from the optical head 120; a mechanism control section 140 for moving the optical head 120 to a target location and performing a servo control operation; a memory 150 for managing the user data that has been read or written and various other kinds of information; a management information storage memory 160 for storing various management information such as information about the latest SBM 30, TDFL 31 or TDDS 32 that has been read from, or written on, the TDMA and DMA; and a system control section 170 for controlling the overall system processing including read/write processing on the optical disc 1.

The system control section 170 includes: a writing section 171 and a reading section 172 for reading and writing data including user data and management information; an access location managing section 173 for determining the location on the optical disc 1, which data is going to be read from, or written on next time, by reference to the management information about the optical disc 1; a management information updating section 174 for updating the management information that is stored in the management information storage memory 160; and a management information generating section 175 for generating TDMS 21 and DMS to be written on the TDMA or DMA by combining the data to be updated from the SBM 30, TDFL 31 and TDDS 32 that are stored in the management information storage memory 160.

(5) Method for Writing (or Initializing) Initial TDMS 20

FIG. 7 is a flowchart showing the procedure in which the optical disc reading/writing apparatus 100 performs initializing formatting processing (i.e., initialization) on the write-once optical disc 1.

First, in Step 701, management information in an initial state is generated. Specifically, the management information generating section 175 generates SBM 30, TDFL 31 and TDDS 32 in the initial state in the management information storage memory 160. In this case, the SBM 30, TDFL 31 and TDDS 32 in the initial state refer to pieces of management information, for which only identifier information has been defined but of which the number of times of update is all zero. As for the SBM 30 and TDFL 31, the "SBM 30 and TDFL 31 in the initial state" are synonymous with the "initial SBM 30" and "initial TDFL 31", respectively.

Next, in Step 702, the initial TDMS 20 is generated. Specifically, the management information generating section 175 makes the initial TDMS 20 in a writing form by combining the SEM 30, TDFL 31 and TDDS 32 with each other so that the management information in the initial state that has been generated in the previous processing step 701 has the form of the initial TDMS 20 shown in FIG. 3. More specifically, the management information generating section 175 secures a data area of three blocks for writing in the management information storage memory 160, resets that area entirely with data zero, and then arranges the initial TDFL 31 at the top of the first block, the TDDS 32 at the end of the first block, the initial SBM 30 from the top of the second block, and the TDDS 32 at the end of the third block, thereby generating data corresponding to the initial TDMS 20. As for the TDDS 32, its value will change when the location information is updated in the processing step 703 or 705 to be described later. That is why it is preferred that the TDDS 32 not be arranged at this point in time but be arranged just before the write operation is performed.

Subsequently, in Step 703, the location information about the TDFL 31 is updated. Specifically, just before starting a write operation, the management information updating section 174 updates the DFL location information in the data corresponding to the TDDS 32 that has been generated in the management information storage memory 160. More specifically, the system control section 170 uses the access location managing section 173 and thereby calculates a writing location (e.g., the top location of the TDMA 17) on which the initial TDMS 20 can be written. Meanwhile, the management information updating section 174 updates the DFL #0 location information 57 so that the information 57 points to the writing location (e.g., the top location of the TDMA 17) that has been calculated by the access location managing section 173, and also resets all of the DEL #1 location information 58, DFL #2 location information 59 and DEL #3 location information 60 into zero. Then, those data are arranged at their predetermined location (e.g., at the end of the first block in this case) in the data area that has been secured for writing in the management information storage memory 160.

As for the location information about the SBM 30, it is still unknown exactly at which location that information will be written eventually. That is why the location information about the SBM 30 may either remain zero or its location information may be predicted on the supposition that that piece of information will also be written properly.

Next, in Step 704, a part of the initial TDMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 703, and then gets the combined data of the initial TDFL 31 and TDDS 32, which is the data of the first block of the initial TDMS 20, written by the writing section 171. If the write operation on this block 3 has failed, then the same series of processing steps are carried out all over again from the processing step 703 and the write operation is repeatedly performed until everything is written correctly.

Thereafter, in Step 705, the location information about the SBM 30 is updated. Specifically, on the verge of starting a write operation, the management information updating section 174 updates the SBM location information in the data corresponding to the TDDS 32 that has been generated in the management information storage memory 160. More specifically, the system control section 170 calculates a writing location (e.g., the second block as counted from the top of the TDMA 17 if the write operation has been done successfully at the first attempt in the previous processing step 704) next to the location on which a part of the initial TDMS 20 has been written in the previous processing step 704 by using the access location managing section 173. Meanwhile, the management information updating section 174 updates the SBM #0 location information 56 so that the information 56 points to the writing location (e.g., the top of the second block as counted from the top of the TDMA 17) that has been calculated by the access location managing section 173, and also updates the SBM #1 location information 61 so that the information 61 points to the next block location (i.e., the top of the third block as counted from the top of the TDMA 17). It should be noted that the write operation is performed with the DFL #0 location information 57 pointing to the same writing location as in the previous processing step 704 and with the DFL #1, #2 and #3 location information 58, 59 and 60 all supposed to be zero (i.e., as in the TDDS 32 that has been written in the previous processing step 704).

Next, in Step 706, another part of the initial TDMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 705, and then gets the combined data of the initial SBM 30 and TDDS 32, which is the data of the remaining two (i.e., second and third) blocks of the initial TDMS 20, written by the writing section 171. If the write operation on any of these blocks has failed, then the same series of processing steps are carried out all over again on that block in question from the processing step 705 and the write operation is repeatedly performed until everything is written correctly on every block.

Although not described for this flow, the TDDS 32 may contain information about the number of times of update in the DDS header 50. During the initializing formatting processing, zero or any other appropriate value indicating that it is information that has been written during the initializing formatting processing is written as the number of times of update. In this case, each of the SBM 30 and the TDFL 31 is written only once during the initializing formatting processing, and therefore, may be written with their information about the number of times of update supposed to be zero. As for the TDDS 32, on the other hand, the TDDS 32 is written twice during the initializing formatting processing. In that case, the write operation is also performed with its information about the number of times of update supposed to be zero in order to indicate that each TDDS 32 is included in the initial TDMS 20. However, the write operation may also be performed with the information about the number of times of update supposed to be zero for the first TDDS 32 to write and one for the second TDDS 32 to write, respectively. That is to say, the write operation may be performed with the exact number of times of update set each time.

By performing these processing steps, the processing of writing the initial TDMS 20 gets done during the initializing formatting. According to the method described above, data including the TDDS 32 can always be arranged at the top location of the TDMA 17. That is why even if the data size of management information has increased due to an increase in the number of recording layers stacked in a single disc or an increase in the storage density of a disc, the area arrangement of the optical disc 1 can still be understood by reading out data from a predetermined location even without searching the TDMA 17 for the latest piece of management information.

Embodiment 2

(1) Area Arrangement

An optical disc 1 as a second specific preferred embodiment of the present invention has the same area arrangement (or layout) as what has already been described for the optical disc 1 of the first preferred embodiment of the present invention.

(2) Data Arrangement of Initial TDMS 20

FIG. 8 illustrates the data arrangement of an initial temporary disc management structure (TDMS) 20 that is written at the top of the temporary disc management area (TDMA) 17 (or the first one of multiple TDMAs) of the optical disc 1 according to the second preferred embodiment of the present invention.

In the initial TDMS 20 of this second preferred embodiment of the present invention, the initial space bitmap (SEM) 30 has different contents from its counterpart of the first preferred embodiment of the present invention described above.

Since the bitmap information 41 of the SBM 30 needs to have a size of one block (i.e., 32 sectors), the combined data of the SBM 30 and the temporary disc definition structure (TDDS) 32 (i.e., the disc management structure update unit) should have a size corresponding to two blocks. As shown in FIG. 8, the initial SBM 30 included in the initial TOMS 20 of this second preferred embodiment of the present invention is characterized by consisting of the SBM header 40 alone and having no bitmap information 41.

This point will be described in further detail. When the initial TDMS 20 is written (i.e., when the initializing formatting is carried out), the entire storage area (including the data area 5) on the optical disc 1 is still unrecorded. That is to say, the bitmap information 41 of the SBM 30 contained in the initial TDMS 20 is written as data consisting of zeros only. In other words, even if no data has actually been written yet, the bitmap information 41 included in the initial TDMS 20 can still be detected. That is why the initial SBM 30 of this preferred embodiment consists of the SBM header 40 alone, with no bitmap information 41, in order to reduce the size of the initial TDMS 20, which is one of the features of this preferred embodiment.

Portion (a) of FIG. 8 illustrates an exemplary layout for the initial TDMS 20. Each of the initial temporary defect list (TDFL) 31 and the TDDS 32 to be included in combination in the initial TDMS 20 has only to have a size of one sector, so does the initial SBM 30. That is why data of one block, including the initial SBM 30, the initial TDFL 31 and the TDDS 32, is treated as a disc management structure update unit only for the initial TDMS 20 and these pieces of information are written as one block collectively.

Portion (b) of FIG. 8 illustrates another exemplary layout for the initial TDMS 20. As in the first preferred embodiment of the present invention described above, the first block of the initial TDMS 20 is data of one block (i.e., a disc management structure update unit), which is a combination of the initial TDFL 31 and the TDDS 32 to be written (or arranged) at the top location, and the next block thereof is data of another block (i.e., a disc management structure update unit), which is a combination of the initial SBM 30 and the TDDS 32 to be written (or arranged) next.

As shown in these drawings, by introducing the initial SBM 30 as data consisting of the SBM header 40 alone into the initial TDMS 20, data including the TDDS 32 can always be arranged on the first block at the top location of the TDMA (or on the first one of its following blocks on which a read/write operation can be performed properly if the first block is a defective block).

(3) Various Kinds of Information Contained in TDDS 32

In the optical disc 1 of the second preferred embodiment of the present invention, each TDDS 32 contains the same data as its counterpart of the optical disc 1 of the first preferred embodiment of the present invention that has already been described with reference to FIG. 4.

(4) Reading/Writing Apparatus

An optical disc reading/writing apparatus 100 for performing a read/write operation on the optical disc 1 of this second preferred embodiment of the present invention has the same configuration as its counterpart of the first preferred embodiment of the present invention that has already been described with reference to FIG. 6.

(5) Method for Writing (or Initializing) Initial TDMS 20

FIG. 9 is a flowchart showing the procedure in which the optical disc reading/writing apparatus 100 performs initializing formatting processing (i.e., initialization) on the write-once optical disc 1 according to the second preferred embodiment of the present invention. In the example to be described below, the initial TDMS 20 is supposed to be written as one block collectively as shown in portion (a) of FIG. 8. It should be noted that the procedure of writing as shown in portion (b) of FIG. 8 is basically the same as what has already been described in Section (5) with reference to FIG. 7 for the first preferred embodiment of the present invention, and the description thereof will be omitted herein.

First, in Step 901, management information in an initial state is generated. Specifically, the management information generating section 175 generates SBM 30, TDFL 31 and TDDS 32 in the initial state in the management information storage memory 160. In this case, the SBM 30, TDFL 31 and TDDS 32 in the initial state refer to pieces of management information, for which only identifier information has been defined but of which the number of times of update is all zero. As for the SBM 30 and TDFL 31, the "SBM 30 and TDFL 31 in the initial state" are synonymous with the "initial SBM 30" and "initial TDFL 31", respectively.

Next, in Step 902, the initial TDMS 20 is generated. Specifically, the management information generating section 175 makes the initial TDMS 20 in a writing form by combining the SBM 30, TDFL 31 and TDDS 32 with each other so that the management information in the initial state that has been generated in the previous processing step 901 has the form of the initial TDMS 20 shown in portion (a) of FIG. 8. More specifically, the management information generating section 175 secures a data area of one block for writing in the management information storage memory 160, resets that area entirely with data zero, and then arranges the initial TDFL 31 at the first sector of that block, the initial SBM 30 at the second last sector of that block, and the TDDS 32 at the last sector of that block, thereby generating data corresponding to the initial TDMS 20. As for the TDDS 32, its value will change when the location information is updated in the processing step 903 to be described later. That is why it is preferred that the TDDS 32 not be arranged at this point in time but be arranged just before the write operation is started.

Subsequently, in Step 903, the location information about the TDFL 31 and the SBM 30 is updated. Specifically, just before starting a write operation, the management information updating section 174 updates the DFL location information and the SBM location information in the data corresponding to the TDDS 32 that has been generated in the management information storage memory 160. More specifically, the system control section 170 uses the access location managing section 173 and thereby calculates a writing location (e.g., the top location of the TDMA 17) on which the initial TDMS 20 can be written. Meanwhile, the management information updating section 174 updates the DFL #0 location information 57 so that the information 57 points to the writing location (e.g., the top location of the TDMA 17) that has been calculated by the access location managing section 173, and also resets all of the DFL #1, #2 and #3 location information 58, 59 and 60 into zero. Furthermore, the management information updating section 174 also updates the SBM #0 location information 56 so that the information 56 points to its writing location in the same block (e.g., the top of the 31$^{st}$ sector as counted from the top of the first block of the TDMA 17). On the other hand, the SBM #1 location information 61 is set to be either zero or a value indicating that there is effective bitmap information 41 but that the information has not been written yet (e.g., FFFFFFFFh, which is a hexadecimal number). Then, those data are arranged at their predetermined location (e.g., at the end of the first block in this case) in the data area that has been secured for writing in the management information storage memory 160.

Next, in Step 904, a part of the initial TDMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 903, and then gets the combined data of the initial SBM 30, initial TDFL 31 and TDDS 32, which is the data of the initial TDMS 20, written by the writing section 171. If the write operation on this block 3 has failed, then the same series of processing steps are carried out all over again from the processing step 903 and the write operation is repeatedly performed until everything is written correctly.

By performing these processing steps, the processing of writing the initial TDMS 20 gets done during the initializing formatting.

According to the method described above, data including the TDDS 32 can always be arranged at the top location of the TDMA 17. That is why even if the data size of management information has increased due to an increase in the number of recording layers stacked in a single disc or an increase in the storage density of a disc, the area arrangement of the optical disc 1 can still be understood by reading out data from a predetermined location even without searching the TDMA 17 for the latest piece of management information.

Embodiment 3

(1) Area Arrangement

An optical disc 1 as a third specific preferred embodiment of the present invention has the same area arrangement (or layout) as what has already been described for the optical disc 1 of the first preferred embodiment of the present invention.

(2) Data Arrangement of Initial TDMS 20

FIG. 10 illustrates the data arrangement of an initial temporary disc management structure (TDMS) 20 that is written at the top of the temporary disc management area (TDMA) 17 (or the first one of multiple TDMAs) of the optical disc 1 according to the third preferred embodiment of the present invention.

In the initial TDMS 20 of this third preferred embodiment of the present invention, the initial space bitmap (SBM) 30 has the same structure as, but is written in a different way from, the counterpart of the first preferred embodiment of the present invention described above.

As shown in FIG. 10, the initial TDMS 20 also includes an initial space bitmap (SBM) 30, temporary disc definition structures (TDDS's) 32 and an initial temporary defect list (TDFL) 31 as in what is shown in FIG. 17 but these elements are written in a different way.

Specifically, the SBM 30, which is a combination of an SBM header 40 with a size of one sector and bitmap information 41 with a size of 31 sectors or more, has a size of at least 32 sectors (i.e., one block). In this preferred embodiment, such an SBM 30 is split into two space bitmaps, each having a size of at most 31 sectors (i.e., initial SBM #0 30 and initial SBM #1 30). Each of these two fragments of data is combined with the TDDS 32 to generate data with a size of one block as a single disc management structure update unit. And the write operation is supposed to be performed on that unit. In this manner, each of those space bitmaps is defined to have a size of one block when combined with the TDDS 32 irrespective of the size of the user data area 14.

More specifically, if the combined size of the SBM header 40 and the bitmap information 41 is one block and one sector (i.e., 33 sectors in total if the SBM header 40 has a size of one sector and the bitmap information 41 has a size of 32 sectors), then an initial SBM #0 30 with effective data of 17 sectors, consisting of the SBM header 40 and the first half (i.e., 16 sectors) of the bitmap information 41 (which will be referred to herein as "partial bitmap information #0 41"), and another initial SBM #1 30 with effective data of 16 sectors that are the second half of the bitmap information 41 (which will be referred to herein as "partial bitmap information #1 41") are formed. Then, each of those SBMs is combined with the TDDS 32, thereby forming a disc management structure update unit and performing a write operation based on that unit. As a result, a write operation can be performed so that the TDDS 32 is arranged on every block as shown in FIG. 10.

In this preferred embodiment, the size of the user data area 14 in a situation where the combined size of the bitmap information 41, the TDDS 32 and the SBM header 40 is one block is supposed to be a "predefined size". If the size of the user data area 14 on a predetermined recording layer exceeds that predefined size, the bitmap information 41 is split into multiple pieces of bitmap information (e.g., two pieces of bitmap information, which will be referred to herein as "partial bitmap information #0 41" and "partial bitmap information #1 41", respectively, if the size of the user data area 14 is twice or less as large as the predefined size). In that case, each of the multiple space bitmaps (i.e., SBMs #0 and #1 30) includes its associated one of the multiple pieces of bitmap information. Each of the multiple space bitmaps (SBMs #0 and #1 30) has a size of one block when combined with the TDDS 32.

It should be noted that as for the data of one block, which is a combination of either the initial SBM #0 30 and the TDDS 32 or the initial SBM #1 30 and the TDDS 32, data other than the 17 sectors of the initial SBM #0 30 and the one sector of the TDDS 32 and the data other than two sectors of the initial SBM #1 30 and one sector of the TDDS 32 are not to be used. That is why such non-used data may be either dummy data consisting of zeros only or padding data indicating its meaninglessness and those non-used data are combined, thereby generating and writing data with a size of one block.

With such an arrangement, even if the size of the SBM 30 (more specifically, the bitmap information 41) increases with the storage capacity per recording layer (i.e., the size of the user data area 14) so much that the size of the disc management structure update unit, i.e., the combined size of the SBM 30 and the TDDS 32, exceeds one block (i.e., two blocks or more), data including the TDDS 32 can always be arranged at the first block of the TDMA 17. And if that first block is a defective one, that data can be arranged at the first one of its following blocks on which a read/write operation can be performed properly. More specifically, with such an arrangement, the TDDS 32 can be written on every block of the TDMA 17 on which the initial TDMS 20 has been written.

It should be noted that this writing method is applicable to not just the initial TDMS 20 during the initializing formatting processing but also a normal TDMS 21 while an ordinary write operation is performed on the TDMA.

In the example described above, the bitmap information 41 with a size of 32 sectors is supposed to be split into partial bitmap information including the data of the first 16 sectors thereof and partial bitmap information including the data of the last 16 sectors thereof and those two pieces of partial bitmap information are supposed to be arranged separately in the SBM #0 30, which is the first one block of the SBM 30 of the initial TDMS 20, and in the SBM #1 30, which is the second one block of the SBM 30, respectively. The advantage to be achieved by such an arrangement will be described.

Specifically, the bitmap information 41 changes when a write operation is performed on an area range to be managed by reference to the bitmap information 41 of the SBM 30. In such a situation, if the write operation has been performed on only a block corresponding to an area managed by reference to the first 16 sectors of the bitmap information 41, just the first 16 sectors of the bitmap information 41 change but the other 16 sectors remain the same.

In that case, only the SBM #0 30 including the data of the first 16 sectors of the bitmap information 41 (i.e., the partial bitmap information #0 41) needs to be updated in the SEM 30. For example, if a write operation has been performed on only the area to be managed by reference to the first 16 sectors (i.e., the partial bitmap information #0 41) of the bitmap information 41 (i.e., in just a part of the area to be managed by reference to the bitmap information 41 of the SBM 30) and the bitmap information 41 has changed as shown in portion (a) of FIG. 11 after the initializing formatting processing has gotten done, just the SBM #0 changed needs to be updated as shown in portion (b) of FIG. 11.

In that case, the SBM #0 location information 56 pointed to by the TDDS 32 is changed into one that points to the top location of the block D that has just been written newly, but the SBM #1 location information 61 may be left as it is so as to still point to the top location of the block B on which the previous write operation has been performed.

If only a part of the management information (such as the SBM 30) to be updated is written on the TDMA 17 as described above, the TDMA 17, which is a management information area, can be used more efficiently compared to a situation where the data of the entire SBM 30 (with a size of two blocks in this example) should be written every time.

Nevertheless, if only such a part to be updated is written on the TDMA 17, the information about the number of times of update contained in the SBM header 40 would be a problem. That is to say, every time the SBM 30 to be written is updated, the write operation should be performed with the information about the number of times of update incremented one by one in the SBM header 40. That is why according to the arrangement in which the SBM header 40 is included in only the SBM #0 30 as shown in FIG. 10, even if a write operation has been performed on an area to be managed by reference to the partial bitmap information #1 41 included in the SBM #1 30 and if just that partial bitmap information #1 41 of the SBM #1 30 has changed, not only the SBM #1 30 but also the SBM #0 30, including the SBM header 40 with the information about the number of times of update, should be written at the same time.

To overcome such a problem, the SBM header 40 may be provided for every disc management structure update unit with a size of one block including the bitmap information 41 as shown in FIG. 12. That is to say, the SBM header 40 may be provided for not just the SBM #0 30 but also the SBM #1 30 as well. In that case, the SBM #1 30 consists of the SBM header and the second 16 sectors of the bitmap information 41 (i.e., the partial bitmap information #1 41) and has effective data with a size of 17 sectors. Then, there will be multiple (e.g., two in this example) independent SBMs 30 on a predetermined recording layer.

More particularly, the SBM header 40 contains information about the area range to be managed by reference to the SBM. That is to say, the user data area 14 to be managed by reference to the bitmap information 41 is split into an area range to be managed with the SBM #0 30 and an area range to be managed with the SBM #1 30 and the SBM header 40 is provided for each of these two ranges to manage it. The area ranges to be managed by reference to the SBM #0 30 and the SBM #1 30 are different from each other. That is why the SBM header 40, containing information about the area ranges to managed with the SBM, is preferably provided for both of the SBMs #0 and #1 30. Also, to update the information about the number of times of update as described above, the SBM header 40 is preferably provided for both of the SBMs #0 and #1 30 when the SBM 30 is partially updated.

As described above, each of the multiple space bitmaps (SBMs #0 and #1 30) for use to manage the user data area 14 on a predetermined recording layer may have a header (i.e., the SBM header 40) containing information about the area range to be managed by reference to the partial bitmap information (i.e., the partial bitmap information #0 or #1 41) contained in itself. Furthermore, the header (i.e., the SBM header 40) of each of the multiple space bitmaps (SBMs #0 and #1 30) may contain information about the number of times of update of the space bitmap SBM 30.

As a result, if a write operation has been performed only on the area to be managed by reference to the partial bitmap information #1 41 included in SEM #1 30 and if only the partial bitmap information #1 41 of SBM #1 30 has changed, just that SBM #1 30 can be updated. On the other hand, if the partial bitmap information of both SBMs #0 and #1 30 has changed, a TDMS 21 including both of those SBMs #0 and #1 30 is written on the TDMA 17. However, if only the partial bitmap information #1 41 of SBM #1 30 has changed, then a TDMS 21 including SBM #1 30 but not including SBM #0 30 is written on the TDMA 17.

As described above, if a write operation has been performed on a management area to be managed by reference to a particular piece of partial bitmap information, then the space bitmap included in that particular piece of partial bitmap information has only to be updated and written on the temporary disc management area TDMA 17. If a write operation has been performed on a space bitmap management area including a particular piece of bitmap information, there is no need to update every space bitmap and write it on the temporary disc management area TDMA 17. That is to say, since only a portion of the management information to be updated can be written on the TDMA 17 in this manner, the temporary disc management area TDMA 17 can be used more efficiently.

In the example described above, the bitmap information 41 with a size of 32 sectors is supposed to be evenly split into first 16 sectors and second 16 sectors to be assigned as respective pieces of partial bitmap information to the SBMs #0 and #1 30. However, the assignment does not always have to be done evenly.

For example, it would also be efficient to assign the first 30 sectors (i.e., the maximum size that any piece of partial bitmap information can possibly have) to the SBM #0 30 and the last two sectors to the SBM #1 30, respectively. This would be effective particularly when only the SBM #0 30 has the SBM header 40 with information about the number of times of update. In that case, the size of the area to be managed with the bitmap information 41 contained in the SBM #0 30 including the SBM header 40 that must be written every time the SBM 30 is written on the TDMA 17 is preferably greater than that of the area to be managed with the bitmap information 41 contained in the SBM #1 30 with no SBM header 40. In such a situation, the bigger the area to be managed by reference to the bitmap information 41, the higher the probability of change of the bitmap information 41 and the less often the SBM #1 30 needs to be updated as a result.

For that reason, if only the partial bitmap information of the SBMs #0 and #1 30 has changed, a TDMS 21 including both the SBM #0 30 and the SBM #1 30 is written on the TDMA 17. However, if only the partial bitmap information #1 41 of the SBM #1 30 has changed, a TDMS 21 including the SBM #1 30 but not including the SBM #0 30 may be written on the TDMA 17. Consequently, the effect of selectively writing only a part of the management information to be updated on the TDMA 17 as described above can be achieved.

Optionally, the header (i.e., the SBM header 40) of the multiple space bitmaps (i.e., the SBMs #0 and #1 30) may include an identifier indicating that this information is a space bitmap (i.e., the SBM #0 or #1 30) and information about the area range to be managed by reference to the partial bitmap information (i.e., the partial bitmap information #0 or #1 41) that each of those space bitmaps (SBMs #0 and #1 30) has. Examples of those pieces of information about the area range to be managed by reference to the partial bitmap information include the top address and size of the area in question.

As a result, by retrieving information (e.g., the top address and size of the area in question) about the area range to be managed with the header of a particular space bitmap, that area managed by reference to that particular space bitmap can be located. In addition, if such information about the area range to be managed by reference to the header (e.g., the top address and size of the area in question) is included, any arbitrary size can be assigned to the space bitmap management area and the assignment patterns can be changed easily, thus allowing the user a broader range of selectivity (or flexibility).

(3) Various Kinds of Information Contained in TDDS 32

In the optical disc 1 of the third preferred embodiment of the present invention, each TDDS 32 contains the same data as its counterpart of the optical disc 1 of the first preferred embodiment of the present invention that has already been described with reference to FIG. 4.

(4) Reading/Writing Apparatus

An optical disc reading/writing apparatus 100 for performing a read/write operation on the optical disc 1 of this third preferred embodiment of the present invention has the same configuration as its counterpart of the first preferred embodiment of the present invention that has already been described with reference to FIG. 6.

Hereinafter, it will be described what processing will be done by the apparatus and method for writing information on the optical disc 1 of the third preferred embodiment of the present invention if the size of the user data area 14 of a particular recording layer exceeds a predetermined size (e.g., the size of the user data area in a situation where the bitmap information 41, the TDDS 32 and the SBM header 40 have a combined size of one block). In that case, multiple space bitmaps (e.g., SBMs #0 and #1 30) are formed with respect to the user data area of the particular recording layer. Then, a disc management structure update unit, including one of the multiple space bitmaps (SBMs #0 and #1 30) and the disc definition structure TDD 32, is written on the temporary disc management area TDMA 17.

Such writing processing and the writing processing to be described later are carried out by making the system control section 170 (see FIG. 6) control the respective components of the reading/writing apparatus 100 and by having the optical head 120 irradiate the optical disc 1 with a laser beam.

Also, if the size of the user data area 14 of a particular recording layer exceeds a predetermined size (e.g., the size of the user data area 14 in a situation where the bitmap information 41, the TDDS 32 and the SBM header 40 have a combined size of one block), then the bitmap information 41 is split into multiple pieces of partial bitmap information (i.e., partial bitmap information #0 and #1 41). Then one of those pieces of partial bitmap information may be provided for each of the multiple space bitmaps (i.e., the SBMs #0 and #1 30).

Also, the disc management structure update unit is written on a block at a predetermined location in the temporary disc management area TDMA 17. Alternatively, instead of such a disc management structure update unit, a second disc management structure update unit, including the disc definition structure TDDS 32 and the initial defect list TDFL 31 and having a size of one block, may also be written. In that case, the temporary disc definition structure TDDS 32 may include the location information of the initial defect list.

The initial defect list TDFL 31 is a TDFL of the smallest size including no DFL entries 43 at all, which are pieces of information about a defective area. That is to say, the initial defect list TDFL 31 is a TDFL including a DFL header 42, for which only identifier information is defined and in which the number of DFL entries 43 and information about the number of times of update are zero, and a DFL terminator 44, for which identifier information is defined and in which information about the number of times of update is zero. As the initial TDFL 31 has a size that is equal to or smaller than one sector, the combined size will be equal to or smaller than one block (i.e., one cluster) even when written along with the TDDS 32.

Also, the "block at a predetermined location in the temporary disc management area TDMA 17" refers to the first one of multiple readable and writable blocks in the temporary disc management area TDMA 17.

Hereinafter, an apparatus and method for reading information from the optical disc 1 of the third preferred embodiment of the present invention will be described. The reading processing is carried out by having the optical head 120 irradiate the optical disc 1 with a laser beam, receiving its reflected light to generate a read signal, and then making the system control section 170 (see FIG. 6) control the respective components of the reading/writing apparatus 100.

A number of space bitmaps (i.e., the SBMs #0 and #1 30) are formed with respect to the user data area 14 in a particular recording layer. In the temporary disc management area TDMA 17 of the optical disc 1, stored is a disc management structure update unit including one of those space bitmaps (SBMs #0 and #1 30) and the temporary disc definition structure TDDS 32 and having a size of one block. From this temporary disc management area TDMA 17 of this optical disc 1, retrieved are a disc management structure update unit including the temporary disc definition structure TDDS 32 and having a size of one block and the space bitmap (i.e., SBM #0 or #1 30).

Also, in the optical disc 1 of this preferred embodiment, the bitmap information 41 is split into multiple pieces of partial bitmap information (i.e., partial bitmap information #0 and #1 41) and one of those pieces of partial bitmap information is provided for each of the multiple space bitmaps (i.e., the SBMs #0 and #1 30). One of those space bitmaps may be read from such an optical disc 1 and partial bitmap information (which may be partial bitmap information #0 or #1 41) may be retrieved from that space bitmap.

Also, on a block at a predetermined location in the temporary disc management area TDMA 17 of the optical disc 1 of this preferred embodiment, stored is either a disc management structure update unit or a second disc management structure update unit including the temporary disc definition structure TDDS 32 and the initial defect list TDFL 31 and having a size of one block. In that case, either the disc management structure update unit or the second disc management structure update unit may be read from a block at a predetermined location in the temporary disc management area TDMA 17. Optionally, the temporary disc definition structure TDDS 32 may have information about the location of an initial defect list. In this case, the "block at a predetermined location in the temporary disc management area TDMA 17" may be the first one of multiple readable and writable blocks in the temporary disc management area TDMA 17.

(5) Method for Writing (or Initializing) Initial TDMS 20

FIG. 13 is a flowchart showing the procedure in which the optical disc reading/writing apparatus 100 performs initializing formatting processing (i.e., initialization) on the write-once optical disc 1 according to the third preferred embodiment of the present invention.

First, in Step 1301, management information in an initial state is generated. Specifically, the management information generating section 175 generates SBM 30, TDFL 31 and TDDS 32 in the initial state in the management information storage memory 160. In this case, the SBM 30, TDFL 31 and TDDS 32 in the initial state refer to pieces of management information, for which only identifier information has been defined but of which the number of times of update is all zero. As for the SBM 30 and TDFL 31, the "SBM 30 and TDFL 31 in the initial state" are synonymous with the "initial SBM 30" and "initial TDFL 31", respectively.

Next, in Step 1302, the initial IDMS 20 is generated. Specifically, the management information generating section 175 makes the initial TDMS 20 in a writing form by combining the SBM 30, TDFL 31 and TDDS 32 with each other so that the management information in the initial state that has been generated in the previous processing step 1301 has the form of the initial TDMS 20 shown in FIG. 10.

More specifically, if the SBM 30 has a size of one block and one sector (i.e., 33 sectors), for example, the management information generating section 175 secures a data area of three blocks for writing in the management information storage memory 160, resets that area entirely with data zero, and then arranges data corresponding to the first 17 sectors (i.e., the initial SBM #0 30 consisting of one sector of the SBM header and the first 16 sectors of the bitmap information 41 (partial bitmap information #0 41)) for the initial SBM 30 from the top of the first block. The management information generating section 175 also arranges the TDDS 32 at the last sector of the first block, data corresponding to the second 16 sectors (i.e., the initial SBM #1 30 including the partial bitmap information #1 41) for the initial SBM 30 from the top of the second block, the TDDS 32 at the last sector of the second block, the initial TDFL 31 at the top of the third block, and the TDDS 32 at the last sector of the third block, thereby generating data corresponding to the initial TDMS 20.

As shown in FIG. 12, each of the multiple space bitmaps (SBMs #0 and #1 30) for use to manage the user data area 14 on a predetermined recording layer may have a header (i.e., the SBM header 40) containing information about the area range to be managed by reference to the partial bitmap information (i.e., the partial bitmap information #0 or #1 41) contained in itself. In that case, the data to be arranged at the top of the second block in the data area that has been secured in the management information storage memory 160 will be data of 17 sectors consisting of one sector of the SBM header 40 and data of the second 16 sectors of the initial SBM 30 (i.e., the initial SBM #1 30 including the partial bitmap information #1 41).

Furthermore, the SBM header 40 may include an identifier indicating that this information is a space bitmap and information about the area range to be managed by reference to each of the multiple space bitmaps (e.g., the top address and size of the area in question). Also, the SBM header 40 may further contain information about the number of times of update of the space bitmap SBM 30.

As for the TDDS 32, its value will change when the location information is updated in the processing step 1303, 1305 or 1307 to be described later. That is why it is preferred that the TDDS 32 not be arranged at this point in time but be arranged just before the write operation is performed.

Subsequently, in Step 1303, the location information about the SBM 30 is updated. Specifically, just before starting a write operation, the management information updating section 174 updates the SBM location information in the data corresponding to the TDDS 32 that has been generated in the management information storage memory 160. More specifically, the system control section 170 uses the access location managing section 173 and thereby calculates a writing location (e.g., the top location of the TDMA 17) on which the initial TDMS 20 can be written. Meanwhile, the management information updating section 174 updates the SBM #0 location information 56 so that the information 56 points to the writing location (e.g., the top location of the TDMA 17) that has been calculated by the access location managing section 173, and also resets all of the DFL #1, #2 and #3 location information 58, 59 and 60 into zero. Then, those data are arranged at their predetermined location (e.g., at the last sector of the first block in this case) in the data area that has been secured for writing in the management information storage memory 160.

As for the SBM #1 location information 61 that is information about the location of the SBM 30 and the TDFL #0 location information 57 that is information about the location of the TDFL 31, it is still unknown at this point in time exactly at which locations those pieces of information should be written eventually. That is why those pieces of location information may either remain zero or their location information may be predicted on the supposition that those pieces of information will also be written properly. For example, the SBM #1 location information 61 may point to the top location of the second block as counted from the top of the TDMA 17 and the DFL #0 location information 57 may point to the top location of the third block as counted from the top of the TDMA 17.

Next, in Step 1304, a part of the initial TOMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 1303, and then gets the combined data of the initial SBM #0 30 and TDDS 32, which is the data of the first block of the initial TDMS 20, written by the writing section 171. If the write operation on this block 3 has failed, then the same series of processing steps are carried out all over again from the processing step 1303 and the write operation is repeatedly performed until everything is written correctly.

Thereafter, in Step 1305, the location information about the SBM 30 is updated. Specifically, on the verge of starting a write operation, the management information updating section 174 updates the SBM location information in the data corresponding to the TDDS 32 that has been generated in the management information storage memory 160. More specifically, the system control section 170 gets a writing location on which the initial TDMS 20 can be written (e.g., the top location of the second block as counted from the top of the TDMA 17 if the write operation has been done successfully at the first attempt in the previous processing step 1304) calculated by the access location managing section 173. Meanwhile, the management information updating section 174 updates the SBM #1 location information 61 so that the information 61 points to the writing location (e.g., the top location of the second block as counted from the top of the TDMA 17) that has been calculated by the access location managing section 173. In this case, the SEM #0 location information 56 is supposed to point to the location on which a write operation has been performed in the previous processing step 1304, and the DFL #1, #2 and #3 location information 58, and 60 is supposed to be zero. Then, those data are arranged at predetermined locations (e.g., at the last sector of the second block as counted from the top in this case) in the data area that has been secured for writing in the management information storage memory 160.

As for the TDFL #0 location information 57 that is information about the location of the TDFL 31, it is still unknown at this point in time exactly at which location that information will be written eventually. That is why the TDFL #0 location information 57 may either remain zero or its location information may be predicted on the supposition that that piece of information will also be written properly. For example, the DFL #0 location information 57 may point to the top location of the third block as counted from the top of the TDMA 17, which is next location where the write operation can be performed.

Next, in Step 1306, a part of the initial TDMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 1305, and then gets the combined data of the initial SBM #1 30 and TDDS 32, which is the data of the second block of the initial TDMS 20, written by the writing section 171. If the write operation on this block 3 has failed, then the same series of processing steps are carried out all over again from the processing step 1305 and the write operation is repeatedly performed until everything is written correctly.

Thereafter, in Step 1307, the location information about the TDFL 31 is updated. Specifically, on the verge of starting a write operation, the management information updating section 174 updates the TDFL location information. More specifically, the system control section 170 gets a writing location on which the initial TDMS 20 can be written (e.g., the third block as counted from the top of the TDMA 17 if the write operation has been done successfully at the first attempt in the previous processing steps 1304 and 1306), next to the location on which the part of the initial TDMS 20 has been written in the previous processing step 1306, calculated by the access location managing section 173. Meanwhile, the management information updating section 174 updates the DFL #0 location information 57 so that the information 57 points to the writing location (e.g., the top location of the third block as counted from the top of the TDMA 17) that has been calculated by the access location managing section 173. In this case, the SBM #0 location information 56 is updated to point to the location on which a write operation has been performed in the previous processing step 1304, the SBM #1 location information 61 is updated to point to the location on which a write operation has been performed in the previous processing step 1306, and the DFL #1, #2 and #3 location information 58, 59 and 60 is written as zero (i.e., as in the TDDS 32 that has been written in the processing step 1304).

Next, in Step 1308, another part of the initial TDMS 20 is written. Specifically, the system control section 170 instructs the laser control section 130 to set writing conditions including laser power and write strategy, gets the optical head 120 moved by the mechanism control section 140 to the writing location that has been determined by the access location managing section 173 in the previous processing step 1307, and then gets the combined data of the initial TDFL 31 and TDDS 32, which is the data of the third block (i.e., the last block) of the initial TDMS 20, written by the writing section 171. If the write operation on this block has failed, then the same series of processing steps are carried out all over again from the processing step 1307 and the write operation is repeatedly performed until everything is written correctly.

The TDDS 32 contains information about the number of times of update in the DDS header 50. During the initializing formatting processing, zero or any other appropriate value indicating that it is information that has been written during the initializing formatting processing is written as the number of times of update. In this case, each of the SBM 30 and the TDFL 31 is written only once during the initializing formatting processing, and therefore, may be written with their information about the number of times of update supposed to be zero. As for the TDDS 32, on the other hand, the TDDS 32 is written three times during the initializing formatting processing. In that case, the write operation is performed with its information about the number of times of update supposed to be zero in order to indicate that each TDDS 32 is included in the initial TDMS 20. However, the write operation may also be performed with the information about the number of times of update supposed to be zero for the first TDDS 32 to write, one for the second TDDS 32 to write and two for the third TDDS 32 to write. That is to say, the write operation may be performed with the exact number of times of update set each time.

By performing these processing steps, the processing of writing the initial TDMS 20 gets done during the initializing formatting.

According to the method described above, the TDDS 32 can be arranged in every block 3 to be written on the TDMA 17 (i.e., the TDDS 322 can also be arranged at a predetermined location such as the top location of the TDMA 17). That is why even if the data size of management information has increased due to an increase in the number of recording layers stacked in a single disc or an increase in the storage density of a disc, the area arrangement of the optical disc 1 can still be understood just by reading out data from a predetermined location even without searching the TDMA 17 for the latest piece of management information.

It has been described with reference to FIG. 13 how to get a write operation done during the initializing formatting processing. However, when a normal TDMS 21 including an SBM 30 is going to be written, for example, not both of the SBM #0 and SBM #1 30 that form the SBM 30 always have to be written as mentioned in Section (2) of the description of the third preferred embodiment of the present invention. That is to say, as in Section (2) of the description of the third preferred embodiment of the present invention, only some block of the SBM 30, in which the bitmap information 41 is updated and which includes information to be written on the TDMA 17, may be written.

The optical disc 1 of any of the first through third preferred embodiments of the present invention described above is a write-once optical disc with at least one recording layer. FIG. 20 illustrates a cross section of the optical disc 1. In FIG. 20, a multilayer optical disc 1 with three recording layers is illustrated as an example. The optical disc 1 includes an information recording layer 1002 consisting of recording layers L0, L1 and L2 that are stacked in this order so that the recording layer L0 is located most distant from that side of the optical disc 1 irradiated with a light beam (i.e., closest to the substrate 1001). The user data area 14 is provided for each of these recording layers.

Figure 1:
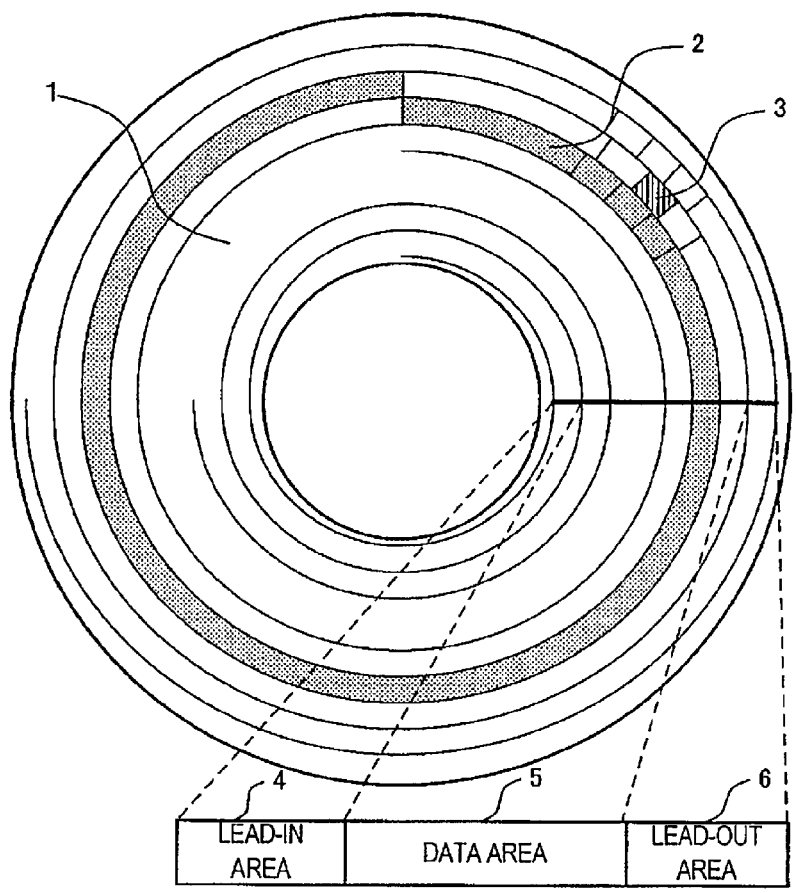
FIG. 1 illustrates an optical disc as a preferred embodiment of the present invention.

It will be described briefly how to make this optical disc 1. First, recording layers L0, L1 and L2, including tracks on which address signals and information signals representing control data are written, are formed in this order on a disc substrate 1001. As a result, recording layers, on each of which the user data area, defect management areas and spare areas are arranged as shown in FIGS. 1 and 2, can be obtained. Optionally, spacer layers may be provided between the recording layers. Also, the recording layers may be coated with a cover layer, for example.

Although not described for the first, second and third preferred embodiments of the present invention, if there are multiple TDMAs as shown in FIG. 15, an indicator area that provides information about the TDMA currently used may sometimes be arranged at the top of the TDMA 17, for example. Even so, the "top location of the TDMA 17" that has been described as an example of the "predetermined location at which the initial TDMS 20 needs to be written" refers herein to the top location of an area for use to write a TDMS (which may be either the initial TDMS 20 or a normal TDMS 21) except such an indicator area, i.e., a block in the management information area of the optical disc 1 on which a write operation is performed earlier than anywhere else (one of multiple readable/writable blocks that is located at the top of the management information area).

Also, according to some alternative method, a copy of the first TDDS 32 to be written on the TDMA could be stored in that indicator area. In that case, the area arrangement of the optical disc 1 could be understood by scanning that indicator. However, in some situation, no such indicator has been stored (e.g., when one of multiple TDMAs to use earliest (such as the TDMA 17 in the lead-in area 4) is used). Even so, the same effect will be achieved by always arranging data including the TDDS 32 at a predetermined location (e.g., the top location of the TDMA to use earliest).

In the first, second, and third preferred embodiments of the present invention described above, the SBM 30 is supposed to have a size of two blocks. However, the same effects as the ones that have already been described for the first, second and third preferred embodiments of the present invention can also be achieved even if the SEM 30 has a size of three blocks or more.

As the SBM 30 has a size of more than one block (i.e., two blocks or more) in the first, second, and third preferred embodiments of the present invention described above, the SBM could have information such as an SBM terminator, indicating that this is the end location of the SBM 30, just like the DFL terminator 44 of the TDFL 31.

Furthermore, in the first, second and third preferred embodiments of the present invention described above, the SBM 30 is supposed to be used as a typical piece of management information. However, the present invention does not have to be applied to just the SBM 30. Rather, the same effect will be achieved even if the present invention is applied to a different kind of management information that has a size of one block or more when written on the TDMA 17, but will form, along with a TDDS 32, a disc management structure update unit with a size of more than one block (i.e., two blocks or more), during the initializing formatting processing, in particular.

Hereinafter, an information recording medium according to the present invention will be described in further detail.

Main Parameters

Although the present invention is applicable to various types of storage media including Blu-ray Discs (BDs) and discs compliant with other standards, the following description will be focused on a BDs. Specifically, BDs are classified according to the property of their recording film into various types. Examples of those various BDs include a BD-ROM (read-only), a BD-R (write-once), and a BD-RE (rewritable). And the present invention is applicable to an R (write-once) type recording medium. Main optical constants and physical formats for Blu-ray Discs are disclosed in "Blu-ray Disc Reader" (published by Ohmsha, Ltd.) and on White Paper at the website of Blu-ray Disc Association (http://www.bluraydisc.com), for example.

Specifically, as for a BD, a laser beam with a wavelength of approximately 405 nm (which may fall within the range of 400 nm to 410 nm supposing the tolerance of errors is ±5 nm with respect to the standard value of 405 nm) and an objective lens with an NA (numerical aperture) of approximately 0.85 (which may fall within the range of 0.84 to 0.86 supposing the tolerance of errors is ±0.01 with respect to the standard value of 0.85) are used. A BD has a track pitch of about 0.32 μm (which may fall within the range of 0.310 to 0.330 μm supposing the tolerance of errors is ±0.010 μm with respect to the standard value of 0.320 μm) and has one or two recording layers. A BD has a single-sided single-layer or a single-sided dual-layer structure on the laser beam incident side, and its storage plane or recording layer is located at a depth of 75 μm to 100 μm as measured from the surface of the protective coating of the BD.

A write signal is supposed to be modulated by 17PP modulation technique. Recording marks are supposed to have the shortest mark length of 0.149 μm or 0.138 μm (which is the length of a 2T mark, where T is one cycle of a reference clock pulse and a reference period of modulation in a situation where a mark is recorded in accordance with a predetermined modulation rule), i.e., a channel bit length T of 74.50 nm or 69.00 nm. The BD has a storage capacity of 25 GB or 27 GB (more exactly, 25.025 GB or 27.020 GB) if it is a single-sided, single-layer disc but has a storage capacity of 50 GB or 54 GB (more exactly, 50.050 GB or 54.040 GB) if it is a single-sided, dual-layer disc.

The channel clock frequency is supposed to be 66 MHz (corresponding to a channel bit rate of 66.000 Mbit/s) at a standard BD transfer rate (BD 1×), 264 MHz (corresponding to a channel bit rate of 264.000 Mbit/s) at BD 4× transfer rate, 396 MHz (corresponding to a channel bit rate of 396.000 Mbit/s) at BD 6× transfer rate, and 528 MHz (corresponding to a channel bit rate of 528.000 Mbit/s) at BD 8× transfer rate.

And the standard linear velocity (which will also be referred to herein as "reference linear velocity" or "1×") is supposed to be 4.917 m/sec or 4.554 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have to be an integer but may also be a positive real number. Optionally, a linear velocity that is lower than the standard linear velocity (such as a 0.5× linear velocity) may also be defined.

It should be noted that these parameters are those of single-layer or dual-layer BDs already on the market, which have a storage capacity of approximately 25 GB or approximately 27 GB per layer. To further increase the storage capacities of BDs, high-density BDs with a storage capacity of approximately 32 GB or approximately 33.4 GB per layer and three- or four-layer BDs have already been researched and developed. Hereinafter, exemplary applications of the present invention to such BDs will be described.

Structure with Multiple Information Recording Layers

For example, supposing the optical disc is a single-sided disc, from/on which information is read and/or written by having a laser beam incident on the protective coating (cover layer) side, if two or more recording layers need to be provided, then those multiple recording layers should be arranged between the substrate and the protective coating. An exemplary structure for such a multilayer disc is shown in FIG. 21. The optical disc shown in FIG. 21 has (n+1) information recording layers 502 (where n is an integer that is equal to or greater than zero). Specifically, in this optical disc, a cover layer 501, (n+1) information recording layers (layers Ln through L0) 502, and a substrate 500 are stacked in this order on the surface on which a laser beam 505 is incident. Also, between each pair of adjacent ones of the (n+1) information recording layers 502, inserted as an optical buffering member is a spacer layer 503. That is to say, the reference layer L0 may be arranged at the deepest level that is located at a predetermined depth from the light incident surface (i.e., at the greatest distance from the light source). Multiple recording layers L1, L2, ... and Ln may be stacked one upon the other from over the reference layer L0 toward the light incident surface.

In this case, the depth of the reference layer L0 as measured from the light incident surface of the multi-layer disc may be equal to the depth (e.g., approximately 0.1 mm) of the only recording layer of a single-layer disc as measured from the light incident surface. If the depth of the deepest layer (i.e., the most distant layer) is constant irrespective of the number of recording layers stacked (i.e., if the deepest layer of a multilayer disc is located at substantially the same distance as the only recording layer of a single-layer disc), compatibility can be ensured in accessing the reference layer, no matter whether the given disc is a single-layer one or a multilayer one. In addition, even if the number of recording layers stacked increases, the influence of tilt will hardly increase. This is because although the deepest layer is affected by tilt most, the depth of the deepest layer of a multilayer disc is approximately the same as that of the only recording layer of a single-layer disc, and does not increase in this case even if the number of recording layers stacked is increased.

As for the beam spot moving direction (which will also be referred to herein as a "tracking direction" or a "spiral direction"), the optical disc may be either a parallel path type or an opposite path type.

In a disc of the parallel path type, the spot goes in the same direction on every layer, i.e., from some inner radial location toward the outer edge of the disc or from some outer radial location toward the inner edge of the disc on every recording layer.

On the other hand, in a disc of the opposite path type, the spot moving directions are changed into the opposite one every time the layers to scan are changed from one recording layer into an adjacent one. For example, if the spot on the reference layer L0 goes from some inner radial location toward the outer edge (which direction will be simply referred to herein as "outward"), then the spot on the recording layer L1 will go from some outer radial location toward the inner edge (which direction will be simply referred to herein as "inward"), the spot on the recording layer L2 will go outward, and so forth. That is to say, the spot on the recording layer Lm (where m is either zero or an even number) will go outward but the spot on the recording layer Lm+1 will go inward. Conversely, the spot on the recording layer Lm (where m is either zero or an even number) will go inward but the spot on the recording layer Lm+1 will go outward.

As for the thickness of the protective coating (cover layer), to minimize the influence of spot distortion due to either a decrease in focal length with an increase in numerical aperture NA or the tilt, the protective coating may have its thickness reduced. A numerical aperture NA is defined to be 0.45 for a CD, 0.65 for a DVD, but approximately 0.85 for a BD. For example, if the recording medium has an overall thickness of approximately 1.2 mm, the protective coating may have a thickness of 10 µm to 200 µm. More specifically, a single-layer disc may include a transparent protective coating with a thickness of approximately 0.1 mm and a substrate with a thickness of approximately 1.1 mm. On the other hand, a dual-layer disc may include a protective coating with a thickness of approximately 0.075 mm, a spacer layer with a thickness of approximately 0.025 mm and a substrate with a thickness of approximately 1.1 mm. And if the disc has three or more recording layers, the thickness(es) of the protective coating and/or spacer layer could be further reduced.

Configurations for Single- to Four-layer Discs

FIGS. 22, 23, 24 and 25 illustrate exemplary configurations for single-layer, dual-layer, three-layer and four-layer discs, respectively. As described above, if the distance from the light incident surface to the reference layer L0 is supposed to be constant, each of these discs may have a total disc thickness of approximately 1.2 mm (but is more preferably 1.40 mm or less if there is a label printed) and the substrate 500 may have a thickness of approximately 1.1 mm. That is why the distance from the light incident surface to the reference layer L0 will be approximately 0.1 mm in any of the examples shown in FIGS. 23 to 25. In the single-layer disc shown in FIG. 22 (i.e., if n=0 in FIG. 21), the cover layer 5011 has a thickness of approximately 0.1 mm. In the dual-layer disc shown in FIG. 23 (i.e., if n=1 in FIG. 21), the cover layer 5012 has a thickness of approximately 0.075 mm and the spacer layer 5302 has a thickness of approximately 0.025 mm. And in the three-layer disc shown in FIG. 24 (i.e., if n=2 in FIG. 21) and in the four-layer disc shown in FIG. 25 (i.e., if n=3 in FIG. 21), the cover layer 5013, 5014 and/or the spacer layer 5303, 5304 may be even thinner.

Manufacturing Process of the Optical Disc

Such a single-layer or multilayer disc (i.e., a disc with k recording layers, where k is an integer that is equal to or greater than one) may be made by performing the following manufacturing process steps.

First of all, the k recording layers, from which information is retrievable using a laser beam with a wavelength of 400 nm to 410 nm through an objective lens with a numerical aperture of 0.84 to 0.86, are formed on a substrate with a thickness of approximately 1.1 mm.

Next, (k−1) spacer layers are formed between the recording layers. As for a single-layer disc, k=1 and k−1=0, and therefore, no spacer layers are provided.

Subsequently, a protective coating with a thickness of 0.1 mm or less is formed on the $k^{th}$ one of the recording layers as counted from the substrate (i.e., the most distant recording layer from the substrate in a multilayer disc).

In the step of forming the recording layers, when the $i^{th}$ recording layer (where i is an odd number that falls within the range of one through k) as counted from the substrate is formed, either concentric or spiral tracks are made so that the laser beam scans that recording layer from some inner radial location on the disc toward the outer edge thereof. On the other hand, when the $j^{th}$ recording layer (where j is an even number that falls within the range of one through k) as counted from the substrate is formed, either concentric or spiral tracks are made so that the laser beam scans that recording layer from some outer radial location on the disc toward the inner edge thereof. As for a single-layer disc, k=1, and therefore, the odd number i that falls within the range of one through k must be one when k=1, and only one recording layer is provided as the $i^{th}$ recording layer. Also, if k=1, there is no even number j that falls within the range of one through k, and therefore, no $j^{th}$ recording layer is provided.

And various areas can be assigned to the tracks on each of those recording layers.

FIG. 26 illustrates the physical structure of an optical disc 1 according to a preferred embodiment of the present invention. On the disklike optical disc 1, a lot of tracks 2 are arranged either concentrically or spirally. And each of those tracks 2 is subdivided into a lot of sectors. As will be described later, data is supposed to be written on each of those tracks 2 on the basis of a block 3 of a predetermined size.

The optical disc 1 of this preferred embodiment has a greater storage capacity per information recording layer than a conventional optical disc (such as a 25 GB BD). The storage capacity is increased by increasing the storage linear density, e.g., by shortening the mark length of recording marks to be left on the optical disc, for example. As used herein, "to increase the storage linear density" means shortening the channel bit length, which is a length corresponding to one cycle time T of a reference clock signal (i.e., a reference cycle time T of modulation in a situation where marks are recorded by a predetermined modulation rule). The optical disc may have multiple information recording layers. In the following description, however, only one information recording layer thereof will be described for convenience sake. In a situation where there are multiple information recording layers in the same optical disc, even if the tracks have the same width between the respective information recording layers, the storage linear densities could also be different from one layer to another by uniformly varying the mark lengths on a layer-by-layer basis.

Each track 2 is divided into a lot of blocks every 64 kB (kilobytes), which is the data storage unit. And sequential block addresses are assigned to those blocks. Each of those blocks is subdivided into three subblocks, each having a predetermined length (i.e., three subblocks form one block). Subblock numbers of 0, 1 and 2 are assigned to the three subblocks in this order.

Storage Density

Figure 27:
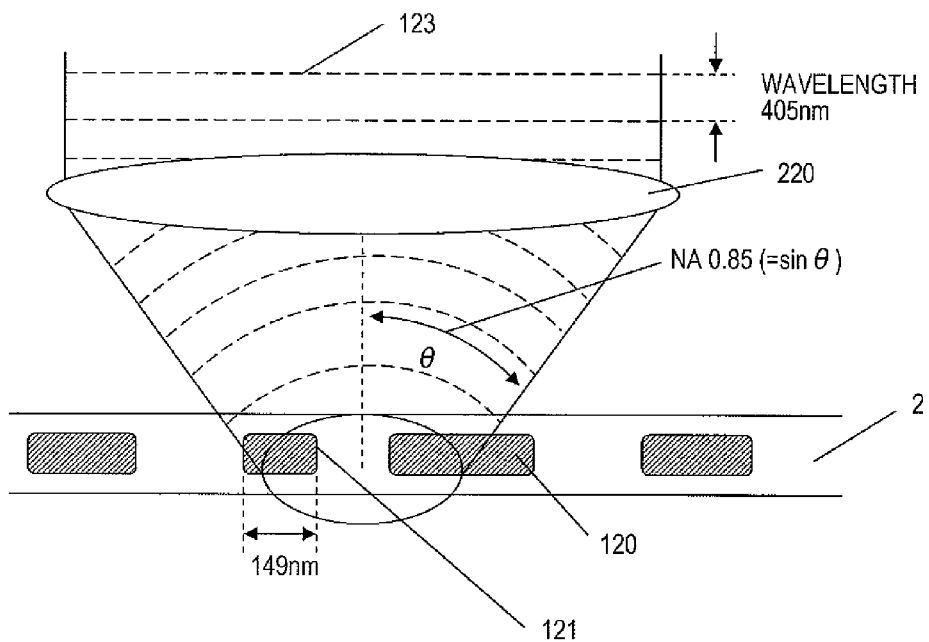
Figure 27:
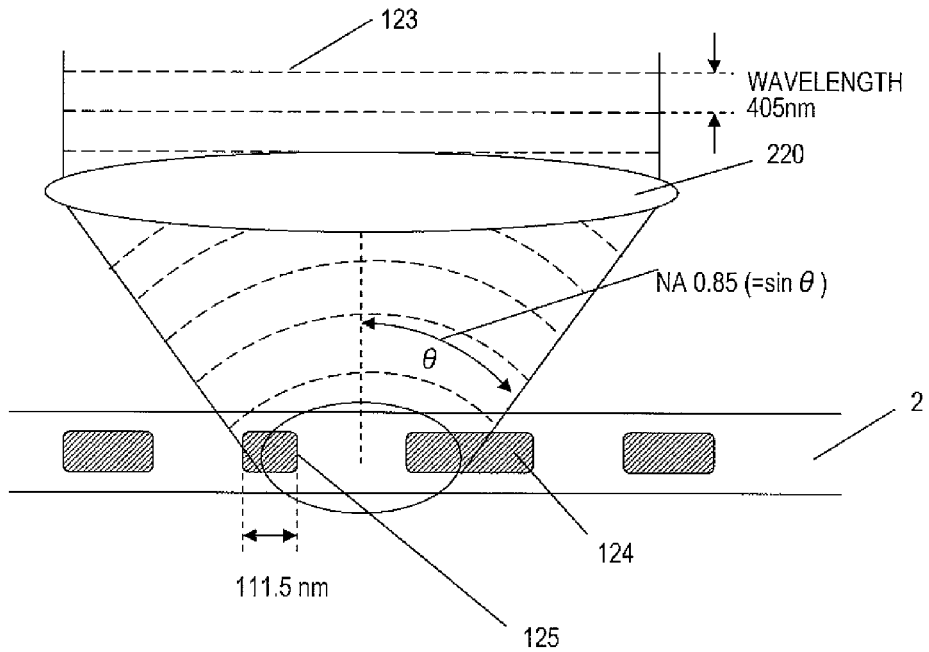

Hereinafter, the storage density will be described with reference to FIGS. 27, 28, and 29.

FIG. 27(A) illustrates an example of a 25 GB BD, for which the laser beam 123 is supposed to have a wavelength of 405 nm and the objective lens 220 is supposed to have a numerical aperture (NA) of 0.85.

As in a DVD, data is also written on the track 2 of a BD as a series of marks 120, 121 that are produced as a result of a physical variation. The shortest one of this series of marks will be referred to herein as the "shortest mark". In FIG. 27(A), the mark 121 is the shortest mark.

In a BD with a storage capacity of 25 GB, the shortest mark 121 has a physical length of 0.149 μm, which is approximately 1/2.7 of the shortest mark of a DVD. And even if the resolution of a laser beam is increased by changing the parameters of an optical system such as the wavelength (405 nm) and the NA (0.85), this value is still rather close to the limit of optical resolution, below which recording marks are no longer sensible for the light beam.

FIG. 28 illustrates a state where a light beam spot is being formed on the series of recording marks on the track. In a BD, the light beam spot 30 has a diameter of about 0.39 μm, which may vary with parameters of the optical system. If the storage linear density is increased without changing the structures of the optical system, then the recording marks will shrink for the same spot size of the light beam spot 30 and the read resolution will decrease.

On the other hand, FIG. 27(B) illustrates an example of an optical disc with an even higher storage density than a 25 GB BD. But even for such a disc, the laser beam 123 is also supposed to have a wavelength of 405 nm and the objective lens 220 is also supposed to have a numerical aperture (NA) of 0.85. Among the series of marks 124, 125 of such a disc, the shortest mark (a 2T mark) 125 has a physical length of 0.1115 μm (or 0.11175 μm). Compared to FIG. 27(A), the spot size remains approximately 0.39 μm but both the recording marks and the interval between the marks have shrunk. As a result, the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the retrievable limit frequency at which the amplitude of the signal goes zero is called an OTF cutoff.

FIG. 29 is a graph showing how the OTF of a BD with a storage capacity of 25 GB changes with the shortest recording mark length. The spatial frequency of the shortest mark on a BD is approximately 80% of, and is rather close to, the OTF cutoff frequency. It can also be seen that a read signal representing the shortest mark has amplitude that is as small as approximately 10% of the maximum detectable amplitude.

The storage capacity at which the spatial frequency of the shortest mark on a BD is very close to the OTF cutoff frequency (i.e., the storage capacity at which the read signal has almost no amplitude) corresponds to approximately 31 GB in a BD. When the frequency of the read signal representing the shortest mark comes close to, or exceeds, the OTF cutoff frequency, the limit of optical resolution may have been reached, or even surpassed, for the laser beam. As a result, the read signal comes to have decreased amplitude and the SNR drops steeply.

That is why the high storage density optical disc shown in FIG. 27(B) would have its storage linear density defined by the frequency of the read signal representing the shortest mark, which may be in the vicinity of the OTF cutoff frequency (i.e., it is lower than, but not significantly lower than, the OTF cutoff frequency) or higher than the OTF cutoff frequency.

FIG. 30 is a graph showing how the signal amplitude changes with the spatial frequency in a situation where the spatial frequency of the shortest mark (2T) is higher than the OTF cutoff frequency and where the 2T read signal has zero amplitude. In FIG. 30, the spatial frequency of the shortest mark 2T is 1.12 times as high as the OTF cutoff frequency.

Relation Between Wavelength, NA and Mark Length

An optical disc B with high storage density needs to satisfy the following relation between the wavelength, the numerical aperture, and the mark/space lengths.

Supposing the shortest mark length is TM nm and the shortest space length is TS nm, the sum P of the shortest mark length and the shortest space length is (TM+TS) nm. In the case of 17 modulation, P=2T+2T=4T. Using the three parameters of the wavelength λ of the laser beam (which is 405 nm±5 nm, i.e., in the range of 400 nm to 410 nm), the numerical aperture NA (which is 0.85±0.01, i.e., in the range of 0.84 to 0.86) and the sum P of the shortest mark length and the shortest space length (where P=2T+2T=4T in the case of 17 modulation, in which the shortest length is 2T), if the unit length T decreases to the point that the inequality $$P \leq \lambda/2NA$$

is satisfied, then the spatial frequency of the shortest mark exceeds the OTF cutoff frequency.

If NA=0.85 and λ=405, then the unit length T corresponding to the OTF cutoff frequency is calculated by $$T=405/(2\times0.85)/4=59.558 \text{ nm}$$

Conversely, if P>λ/2NA is satisfied, then the spatial frequency of the shortest mark becomes lower than the OTF cutoff frequency.

As can be seen easily, just by increasing the storage linear density, the SNR would decrease due to the limit of optical resolution. That is why if the number of information recording layers per disc were increased excessively, then the decrease in SNR might be an impermissible degree, considering the system margin. Particularly around a point where the frequency of the shortest recording mark exceeds the OTF cutoff frequency, the SNR will start to decrease steeply.

In the foregoing description, the storage density has been described by comparing the frequency of the read signal representing the shortest mark to the OTF cutoff frequency. However, if the storage density of BDs is further increased, then the storage density (and the storage linear density and the storage capacity) can be defined based on the same principle as what has just been described by reference to the relation between the frequency of the read signal representing the second shortest mark (or the third shortest mark or an even shorter recording mark) and the OTF cutoff frequency.

Storage Density and Number of Layers

A BD, of which the specifications include a wavelength of 405 m and a numerical aperture of 0.85, may have one of the following storage capacities per layer. Specifically, if the spatial frequency of the shortest marks is in the vicinity of the OTF cutoff frequency, the storage capacity could be approximately equal to or higher than 29 GB (such as 29.0 GB±0.5 GB or 29 GB±1 GB), approximately equal to or higher than 30 GB (such as 30.0 GB±0.5 GB or 30 GB±1 GB), approximately equal to or higher than 31 GB (such as 31.0 GB±0.5 GB or 31 GB±1 GB), or approximately equal to or higher than 32 GB (such as 32.0 GB±0.5 GB or 32 GB±1 GB).

On the other hand, if the spatial frequency of the shortest marks is equal to or higher than the OTF cutoff frequency, the storage capacity per layer could be approximately equal to or higher than 32 GB (such as 32.0 GB±0.5 GB or 32 GB±1 GB), approximately equal to or higher than 33 GB (such as 33.0 GB±0.5 GB or 33 GB±1 GB), approximately equal to or higher than 33.3 GB (such as 33.3 GB±0.5 GB or 33.3 GB±1 GB), approximately equal to or higher than 33.4 GB (such as 33.4 GB±0.5 GB or 33.4 GB±1 GB), approximately equal to or higher than 34 GB (such as 34.0 GB±0.5 GB or 34 GB±1 GB) or approximately equal to or higher than 35 GB (such as 35.0 GB±0.5 GB or 35 GB±1 GB).

In this case, if the storage density per layer is 33.3 GB, an overall storage capacity of approximately 100 GB (more exactly, 99.9 GB) is realized by the three recording layers combined. On the other hand, if the storage density per layer is 33.4 GB, an overall storage capacity that is more than 100 GB (more exactly, 100.2 GB) is realized by the three recording layers combined. Such a storage capacity is almost equal to the capacity in a situation where four recording layers, each having a storage density of 25 GB, are provided for a single BD. For example, if the storage density per layer is 33 GB, the overall storage capacity is 33×3=99 GB, which is just 1 GB (or less) smaller than 100 GB. On the other hand, if the storage density per layer is 34 GB, the overall storage capacity is 34×3=102 GB, which is 2 GB (or less) larger than 100 GB. Furthermore, if the storage density per layer is 33.3 GB, the overall storage capacity is 33.3×33.3×3=99.9 GB, which is only 0.1 GB (or less) smaller than 100 GB. And if the storage density per layer is 33.4 GB, the overall storage capacity is 33.4×3=100.2 GB, which is just 0.2 GB (or less) larger than 100 GB.

It should be noted that if the storage density were increased significantly, then it would be difficult to perform a read operation accurately because the shortest marks should be read under rather severe conditions. That is why a realistic storage density that would realize an overall storage capacity of 100 GB or more without increasing the storage density too much would be approximately 33.4 GB per layer.

In this case, the optical disc may have either a four-layer structure with a storage density of 25 GB per layer or a three-layer structure with a storage density of 33-34 GB per layer. If the number of recording layers stacked in a disc is increased, however, the read signal obtained from each of those layers will have decreased amplitude (or a decreased SNR) and stray light will also be produced from those layers (i.e., the read signal obtained from each recording layer will be affected by a signal obtained from an adjacent layer). For that reason, if a three-layer disc with a storage density of 33-34 GB per layer is adopted instead of a four-layer disc with a storage density of 25 GB per layer, then an overall storage capacity of approximately 100 GB will be realized by the smaller number of layers (i.e., three instead of four) with the influence of such stray light minimized. That is why a disc manufacturer who'd like to realize an overall storage capacity of approximately 100 GB while minimizing the number of recording layers stacked would prefer a three-layer disc with a storage density of 33-34 GB per layer. On the other hand, a disc manufacturer who'd like to realize an overall storage capacity of approximately 100 GB using the conventional format as it is (i.e., a storage density of 25 GB per layer) could choose a four-layer disc with a storage density of 25 GB per layer. In this manner, manufacturers with different needs could achieve their goals using mutually different structures, and therefore, are afforded an increased degree of flexibility in disc design.

Alternatively, if the storage density per layer is in the 30-32 GB range, the overall storage capacity of a three-layer disc will be short of 100 GB (i.e., approximately 90-96 GB) but that of a four-layer disc will be 120 GB or more. Among other things, if the storage density per layer is approximately 32 GB, a four-layer disc will have an overall storage capacity of approximately 128 GB, which is the seventh power of two that would be processed easily and conveniently by a computer. On top of that, compared to the overall storage capacity of approximately 100 GB realized by a three-layer disc, even shortest marks could also be read under less severe conditions.

That is why when the storage density needs to be increased, a number of different storage densities per layer (such as approximately 32 GB and approximately 33.4 GB) are preferably offered as multiple options so that a disc manufacturer can design a disc more flexibly by adopting one of those multiple storage densities and any number of recording layers in an arbitrary combination. For example, a manufacturer who'd like to increase the overall storage capacity while minimizing the influence of multiple layers stacked is offered an option of making a three-layer disc with an overall storage capacity of approximately 100 GB by stacking three recording layers with a storage density of 33-34 GB per layer. On the other hand, a manufacturer who'd like to increase the overall storage capacity while minimizing the impact on read performance is offered an option of making a four-layer disc with an overall storage capacity of approximately 120 GB or more by stacking four recording layers with a storage density of 30-32 GB per layer.

Furthermore, if grooves are cut on an optical information recording medium, the recording medium comes to have groove portions and land portion between the groove portions. That is why the methods of writing data need to be changed depending on whether data should be written on groove portions or on land portions. Specifically, data can be written in various manners, e.g., only on groove portions, only on land portions, or both on groove and land portions. In this case, a method of writing data on portions (i.e., either groove portions or land portions) that are raised as viewed from under the light incident surface is called "On-Groove" writing. On the other hand, a method of writing data on portions that are depressed as viewed from under the light incident surface is called "In-Groove" writing. According to the present invention, at least one of these two writing methods may be adopted arbitrarily. That is to say, only the On-Groove writing or only the In-Groove writing should be adopted, or one of these two methods could be used selectively.

If one of these two writing methods needs to be permitted selectively, writing method specifying information, indicating which of the two writing methods (i.e., the On-Groove writing or In-Groove writing) should be adopted for the medium, may be written on the medium. As for a multilayer medium, the writing method specifying information for the respective layers needs to be stored. In that case, the writing method specifying information for the respective layers may be stored collectively in the reference layer (which could be the deepest (L0) or shallowest layer as viewed from under the light incident surface or the layer to be accessed earlier than any other layer during a disc loading process).

Alternatively, only an associated piece of writing method specifying information may be stored in each layer. Still alternatively, the writing method specifying information for all layers could be stored on each and every layer.

Also, the writing method specifying information could be stored in the BCA (burst cutting area) or a disc information area or superposed on the wobbled groove. The disc information area is located inside and/or outside of the data storage area and used to store mainly control information. The disc information area is a read-only area and may have a broader track pitch than the data storage area. The writing method specifying information could be stored in one, any two, or even all, of these areas and portions.

Furthermore, the direction in which the groove starts wobbling for the very first time according to the On-Groove writing method may be opposite to the one according to the In-Groove writing method. That is to say, if the groove starts to wobble inward (i.e., toward the center of the disc) according to the On-Groove writing method, then the groove should start to wobble outward according to the In-Groove writing method. Alternatively, if the groove starts to wobble outward according to the On-Groove writing method, then the groove should start to wobble inward according to the In-Groove writing method. In this manner, by getting the groove to start wobbling in mutually opposite directions between the On-Groove and In-Groove writing methods, the polarity of tracking can be the same, no matter which of these two methods is adopted. This is because although a write operation is performed on the raised portion according to the On-Groove writing method as viewed from under the light incident surface, a write operation is performed on the depressed portion according to the In-Groove writing method as viewed from under the light incident surface. That is why supposing the groove depths are the same between these two methods, their tracking polarities will be opposite to each other. Thus, if the groove is supposed to start wobbling in mutually opposite directions between these two methods, then their tracking polarities should be the same.

The recording film may have the following two different properties, which are determined by the reflectances of recorded and unrecorded portions thereof. Specifically, if the unrecorded portion has a higher reflectance than the recorded portion, then the recording film has high-to-low (H to L) property. On the other hand, if the unrecorded portion has a lower reflectance than the recorded portion, then the recording film has low-to-high (L to H) property. According to the present invention, at least one of these two recording film properties may be adopted arbitrarily. That is to say, the recording film of a given medium may have only the H to L property or only the L to H property. Or the recording film could permit one of these two properties selectively.

If one of these two properties needs to be permitted selectively, recording film property specifying information, indicating which of the two properties the recording film should have (i.e., either H to L or L to H), may be written on the medium. As for a multilayer medium, the recording film property specifying information for the respective layers needs to be stored. In that case, the recording film property specifying information for the respective layers may be stored collectively in the reference layer (which could be the deepest (L0) or shallowest layer as viewed from under the light incident surface or the layer to be accessed earlier than any other layer during a disc loading process). Alternatively, only an associated piece of recording film property specifying information may be stored in each layer. Still alternatively, the recording film property specifying information for all layers could be stored on each and every layer.

Also, the recording film property specifying information could be stored in the BOA (burst cutting area) or a disc information area or superposed on the wobbled groove. The disc information area is located inside and/or outside of the data storage area and used to store mainly control information. The disc information area is a read-only area and may have a broader track pitch than the data storage area. The recording film property specifying information could be stored in one, any two, or even all, of these areas and portions.

As for the various formats and methods mentioned above, as the storage densities increase, optical disc media will have multiple different storage densities. In that case, only some of those various formats and methods could be adopted according to the storage density or others could be changed into different formats or methods.

As described above, a write-once information recording medium according to the present invention has at least one recording layer and information is written on a block-by-block basis on it. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information writing apparatus according to the present invention writes information on a write-once information recording medium, which has at least one recording layer and on which information is written on a block-by-block basis. The write-once information recording medium includes: a user data area on which user data is going to be written; and a management information area to store management information about the write-once information recording medium.

The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, the information writing apparatus generates multiple space bitmaps for the user data area of the predetermined recording layer, and writes a disc management structure update unit, including one of the multiple space bitmaps and the disc definition structure and having a size of one block, on the management information area.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information writing method according to the present invention is designed to write information on a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. The information writing method includes the steps of: if the size of the user data area on the predetermined recording layer exceeds a predetermined one, generating multiple space bitmaps for the user data area of the predetermined recording layer; and writing a disc management structure update unit, including one of the multiple space bitmaps and the disc definition structure and having a size of one block, on the management information area.

In one preferred embodiment, the method further includes the steps of: if the size of the user data area on the predetermined recording layer exceeds the predetermined size, dividing the bitmap information into multiple pieces of bitmap information; and associating one of those pieces of bitmap information with each of the multiple space bitmaps.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit Of a second disc management structure update unit, which includes the disc definition structure and an initial defect list and which has a size of one block. The disc definition structure includes location information about the initial defect list, which provides no information about a defective area.

In this particular preferred embodiment, the block at the predetermined location is located at the top of multiple readable and writable blocks in the management information area.

An information reading apparatus according to the present invention reads information from a write-once information recording medium, which has at least one recording layer and on which information is written on a block-by-block basis. The write-once information recording medium includes: a user data area on which user data is going to be written; and a management information area to store management information about the write-once information recording medium.

The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area. And the information reading apparatus reads the disc management structure update unit, including the disc definition structure and having a size of one block, from the management information area and obtains the space bitmap.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information. And the information reading apparatus reads an associated piece of bitmap information from each space bitmap.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases, and the predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list. The initial defect list provides no information about a defective area. The information reading apparatus reads either the disc management structure update unit or the second disc management structure update unit from a block at the predetermined location.

In this particular preferred embodiment, the block at the predetermined location is located at the top of multiple readable and writable blocks in the management information area.

An information reading method according to the present invention is designed to read information from a write-once information recording medium, which has at least one recording layer and on which information is written on a block-by-block basis. The write-once information recording medium includes: a user data area on which user data is going to be written; and a management information area to store management information about the write-once information recording medium. The user data area is provided for each recording layer. The management information includes: a space bitmap including bitmap information for use to manage recording statuses in the user data area on a predetermined one of the recording layers; and a disc definition structure including location information of the space bitmap. The size of the space bitmap is determined so that the combined size of the space bitmap itself and the disc definition structure always becomes equal to that of one block, irrespective of the size of the user data area. If the size of the user data area on the predetermined recording layer exceeds a predetermined one, multiple space bitmaps are generated for the user data area of the predetermined recording layer. A disc management structure update unit, including one of the multiple space bitmaps and the disc definition structure and having a size of one block, is written on the management information area. The information reading method includes the step of reading the disc management structure update unit, including the disc definition structure and having a size of one block, from the management information area and obtains the space bitmap.

In one preferred embodiment, if the size of the user data area on the predetermined recording layer exceeds the predetermined size, the bitmap information is divided into multiple pieces of bitmap information. Each of the multiple space bitmaps is provided with one of those pieces of bitmap information. The information reading method further includes the step of reading an associated piece of bitmap information from each space bitmap.

In this particular preferred embodiment, each of the multiple space bitmaps includes a header that provides information about an area range to be managed by reference to its associated piece of bitmap information for the space bitmap itself.

In a specific preferred embodiment, the size of the bitmap information increases as the size of the user data area increases. The predetermined size is the size of the user data area when the combined size of the bitmap information, the disc definition structure, and the header becomes equal to that of one block.

In another preferred embodiment, the header provides information about the top address and size of an area range managed by reference to that piece of bitmap information.

In still another preferred embodiment, the header provides information about the number of times the space bitmap has been updated.

In yet another preferred embodiment, on a block at a predetermined location in the management information area, written is either the disc management structure update unit or a second disc management structure update unit, which includes the disc definition structure and an initial defect list and which has a size of one block. The disc definition structure includes location information about the initial defect list. The initial defect list provides no information about a defective area. The information reading method includes the step of reading either the disc management structure update unit or the second disc management structure update unit from a block at the predetermined location in the management information area.

In this particular preferred embodiment, the block at the predetermined location is located at the top of multiple readable and writable blocks in the management information area.

Another information recording medium according to the present invention is a write-once information recording medium, which has at least one recording layer and on which a write operation is performed on a block-by-block basis. The write-once information recording medium includes: a data area on which user data is going to be written; and a management information area to store a disc management structure, which provides management information about the information recording medium. The data area is provided for each recording layer. The disc management structure includes: a space bitmap for use to examine recorded and unrecorded statuses in the data area on a recording layer basis; a defect list for managing defects in the data area; and a disc definition structure including layout information of the write-once information recording medium and location information of the space bitmap and the defect list. The space bitmap and the defect list are written on the management information area on the basis of a disc management structure update unit, which is defined by combining the disc definition structures with each other. The combined size of the space bitmap and the disc definition structure on each recording layer is more than one block. And the disc management structure update unit with a size of one block, including the disc definition structure, is written at least on a block at a predetermined location in the management information area.

In one preferred embodiment, the block at the predetermined location is a block in the management information area on which a write operation is performed earlier than any other block.

In another preferred embodiment, the block at the predetermined location is located at the top of the management information area.

In still another preferred embodiment, the disc definition structure update unit with a size of one block, formed by combining the defect list and the disc definition structure in an initial state, is written on the block at the predetermined location.

In yet another preferred embodiment, the space bitmap on each recording layer is divided into a number of space bitmap portions that are able to form the disc definition structure update unit with a size of one block when combined with the disc definition structure. The disc definition structure update unit with a size of one block, which is formed by combining the space bitmap portions and the disc definition structure, is written on the management information area.

In yet another preferred embodiment, the space bitmap on each recording layer is made up of: bitmap data indicating whether each block in the data area is recorded or unrecorded; and a header that provides information about the bitmap data. The disc definition structure update unit, formed by combining the header and the disc definition structure without the bitmap data of the space bitmap, is written on the block at the predetermined location.

Another information writing method according to the present invention is designed to perform a write operation on a write-once information recording medium, which has at least one recording layer and on which information is written on a block-by-block basis. The write-once information recording medium includes: a data area on which user data is going to be written; and a management information area to store a disc management structure, which provides management information about the information recording medium. The data area is provided for each recording layer. The disc management structure includes: a space bitmap for use to examine recorded and unrecorded statuses in the data area on a recording layer basis; a defect list for managing defects in the data area; and a disc definition structure including layout information of the write-once information recording medium and location information of the space bitmap and the defect list. The space bitmap and the defect list are written on the management information area on the basis of a disc management structure update unit, which is defined by combining the disc definition structures with each other. The combined size of the space bitmap and the disc definition structure on each recording layer is more than one block. The information writing method includes the step of writing the disc management structure update unit with a size of one block, including the disc definition structure, at least on a block at a predetermined location in the management information area.

In one preferred embodiment, the block at the predetermined location is a block in the management information area on which a write operation is performed earlier than any other block.

In another preferred embodiment, the block at the predetermined location is located at the top of the management information area.

In still another preferred embodiment, the disc definition structure update unit with a size of one block, formed by combining the defect list and the disc definition structure in an initial state, is written on the block at the predetermined location.

In yet another preferred embodiment, the space bitmap on each recording layer is divided into a number of space bitmap portions that are able to form the disc definition structure update unit with a size of one block when combined with the disc definition structure. The disc definition structure update unit with a size of one block, which is formed by combining the space bitmap portions and the disc definition structure, is written on the management information area.

In yet another preferred embodiment, the space bitmap on each recording layer is made up of: bitmap data indicating whether each block in the data area is recorded or unrecorded; and a header that provides information about the bitmap data. The disc definition structure update unit, formed by combining the header and the disc definition structure without the bitmap data of the space bitmap, is written on the block at the predetermined location.

Another information writing apparatus according to the present invention is designed to perform a write operation on a write-once information recording medium, which has at least one recording layer and on which information is written on a block-by-block basis. The write-once information recording medium includes: a data area on which user data is going to be written; and a management information area to store a disc management structure, which provides management information about the information recording medium. The data area is provided for each recording layer. The disc management structure includes: a space bitmap for use to examine recorded and unrecorded statuses in the data area on a recording layer basis; a defect list for managing defects in the data area; and a disc definition structure including layout information of the write-once information recording medium and location information of the space bitmap and the defect list. The space bitmap and the defect list are written on the management information area on the basis of a disc management structure update unit, which is defined by combining the disc definition structures with each other. The combined size of the space bitmap and the disc definition structure on each recording layer is more than one block. The information writing apparatus includes a control section for writing the disc management structure update unit with a size of one block, including the disc definition structure, at least on a block at a predetermined location in the management information area.

In one preferred embodiment, the block at the predetermined location is a block in the management information area on which a write operation is performed earlier than any other block.

In another preferred embodiment, the block at the predetermined location is located at the top of the management information area.

In still another preferred embodiment, the control section writes the disc definition structure update unit with a size of one block, formed by combining the defect list and the disc definition structure in an initial state, on the block at the predetermined location.

In yet another preferred embodiment, the space bitmap on each recording layer is divided into a number of space bitmap portions that are able to form the disc definition structure update unit with a size of one block when combined with the disc definition structure. The control section writes the disc definition structure update unit with a size of one block, which is formed by combining the space bitmap portions and the disc definition structure, on the management information area.

In yet another preferred embodiment, the space bitmap on each recording layer is made up of: bitmap data indicating whether each block in the data area is recorded or unrecorded; and a header that provides information about the bitmap data. The control section writes the disc definition structure update unit, formed by combining the header and the disc definition structure without the bitmap data of the space bitmap, on the block at the predetermined location.

Another information reading method according to the present invention is a method for reading information from a write-once information recording medium, which has at least one recording layer and on which a write operation is performed on a block-by-block basis. The write-once information recording medium includes: a data area on which user data is going to be written; and a management information area to store a disc management structure, which provides management information about the information recording medium. The data area is provided for each recording layer. The disc management structure includes: a space bitmap for use to examine recorded and unrecorded statuses in the data area on a recording layer basis; a defect list for managing defects in the data area; and a disc definition structure including layout information of the write-once information recording medium and location information of the space bitmap and the defect list. The space bitmap and the defect list are written on the management information area on the basis of a disc management structure update unit, which is defined by combining the disc definition structures with each other. The combined size of the space bitmap and the disc definition structure on each recording layer is more than one block. And the information reading method includes the step of reading the disc management structure update unit with a size of one block, including the disc definition structure, at least from a block at a predetermined location in the management information area.

Another information reading apparatus according to the present invention is designed to read information from a write-once information recording medium, which has at least one recording layer and on which a write operation is performed on a block-by-block basis. The write-once information recording medium includes: a data area on which user data is going to be written; and a management information area to store a disc management structure, which provides management information about the information recording medium. The data area is provided for each recording layer. The disc management structure includes: a space bitmap for use to examine recorded and unrecorded statuses in the data area on a recording layer basis; a defect list for managing defects in the data area; and a disc definition structure including layout information of the write-once information recording medium and location information of the space bitmap and the defect list. The space bitmap and the defect list are written on the management information area on the basis of a disc management structure update unit, which is defined by combining the disc definition structures with each other. The combined size of the space bitmap and the disc definition structure on each recording layer is more than one block. And the information reading apparatus includes a control section for reading the disc management structure update unit with a size of one block, including the disc definition structure, at least from a block at a predetermined location in the management information area.

An information recording medium according to the present invention can be used as a write-once optical disc on which a write operation can be performed at random at any locations. Also, an information reading/writing method according to the present invention is applicable to an optical disc drive that can read and write from/to a write-once optical disc on which a write operation can be performed at random at any locations.

What is claimed is:

1. A write-once information recording medium, which has at least one recording layer and on which information is written on a block-by-block basis,
   wherein the write-once information recording medium comprises:
   a user data area on which user data is going to be written; and
   a management information area to store management information about the write-once information recording medium, and
   wherein the user data area is provided for each said recording layer, and
   wherein the management information comprises:
   a space bitmap including bitmap information for use to manage recording statuses in the user data area on a predetermined one of the recording layers; and
   a disc definition structure including location information of the space bitmap, and
   wherein the size of the space bitmap is determined so that the combined size of the space bitmap itself and the disc definition structure always becomes equal to that of one block, irrespective of the size of the user data area, and
   wherein if the size of the user data area on the predetermined recording layer exceeds a predetermined one, multiple space bitmaps are generated for the user data area of the predetermined recording layer, and
   wherein a disc management structure update unit, including one of the multiple space bitmaps and the disc definition structure and having a size of one block, is written on the management information area, and
   wherein on a block at a predetermined location in the management information area, written is either the disc management structure update unit or a second disc management structure update unit, which includes the disc definition structure and an initial defect list and which has a size of one block, and
   wherein the disc definition structure includes location information about the initial defect list, and
   wherein the initial defect list provides no information about a defective area.

2. The write-once information recording medium of claim 1, wherein the block at the predetermined location is located at the top of multiple readable and writable blocks in the management information area.

3. An information writing apparatus for writing information on a write-once information recording medium, which has at least one recording layer and on which information is written on a block-by-block basis,
   wherein the write-once information recording medium comprises:
   a user data area on which user data is going to be written; and
   a management information area to store management information about the write-once information recording medium, and
   wherein the user data area is provided for each said recording layer, and
   wherein the management information comprises:
   a space bitmap including bitmap information for use to manage recording statuses in the user data area on a predetermined one of the recording layers; and
   a disc definition structure including location information of the space bitmap, and
   wherein the size of the space bitmap is determined so that the combined size of the space bitmap itself and the disc definition structure always becomes equal to that of one block, irrespective of the size of the user data area, and
   wherein the information writing apparatus comprising:
   a writing section for writing information on the write-once information recording medium, and
   a control section for controlling the writing section, and
   wherein if the size of the user data area on the predetermined recording layer exceeds a predetermined one, the control section generates multiple space bitmaps for the user data area of the predetermined recording layer, and the control section controls the writing section so as to write a disc management structure update unit, including one of the multiple space bitmaps and the disc definition structure and having a size of one block, on the management information area, and
   wherein on a block at a predetermined location in the management information area, written is either the disc management structure update unit or a second disc management structure update unit, which includes the disc definition structure and an initial defect list and which has a size of one block, and
   wherein the disc definition structure includes location information about the initial defect list, and
   wherein the initial defect list provides no information about a defective area.

4. The information writing apparatus of claim 3, wherein the block at the predetermined location is located at the top of multiple readable and writable blocks in the management information area.

5. An information writing method for writing information on a write-once information recording medium, which has at least one recording layer and on which information is written on a block-by-block basis,
   wherein the write-once information recording medium comprises:
   a user data area on which user data is going to be written; and
   a management information area to store management information about the write-once information recording medium, and
   wherein the user data area is provided for each said recording layer, and
   wherein the management information comprises:
   a space bitmap including bitmap information for use to manage recording statuses in the user data area on a predetermined one of the recording layers; and
   a disc definition structure including location information of the space bitmap, and
   wherein the size of the space bitmap is determined so that the combined size of the space bitmap itself and the disc definition structure always becomes equal to that of one block, irrespective of the size of the user data area, and wherein the information writing method comprises the steps of:

if the size of the user data area on the predetermined recording layer exceeds a predetermined one, generating multiple space bitmaps for the user data area of the predetermined recording layer, and writing a disc management structure update unit, including one of the multiple space bitmaps and the disc definition structure and having a size of one block, on the management information area, and wherein on a block at a predetermined location in the management information area, written is either the disc management structure update unit or a second disc management structure update unit, which includes the disc definition structure and an initial defect list and which has a size of one block, and wherein the disc definition structure includes location information about the initial defect list, and wherein the initial defect list provides no information about a defective area.

6. The information writing method of claim 5, wherein the block at the predetermined location is located at the top of multiple readable and writable blocks in the management information area.

7. An information reading apparatus for reading information from a write-once information recording medium, which has at least one recording layer and on which information is written on a block-by-block basis, wherein the write-once information recording medium comprises:

a user data area on which user data is going to be written; and a management information area to store management information about the write-once information recording medium, and wherein the user data area is provided for each said recording layer, and wherein the management information comprises:

a space bitmap including bitmap information for use to manage recording statuses in the user data area on a predetermined one of the recording layers; and a disc definition structure including location information of the space bitmap, and wherein the size of the space bitmap is determined so that the combined size of the space bitmap itself and the disc definition structure always becomes equal to that of one block, irrespective of the size of the user data area, and wherein if the size of the user data area on the predetermined recording layer exceeds a predetermined one, multiple space bitmaps are generated for the user data area of the predetermined recording layer, and a disc management structure update unit, including one of the multiple space bitmaps and the disc definition structure and having a size of one block, is written on the management information area, and wherein on a block at a predetermined location in the management information area, written is either the disc management structure update unit or a second disc management structure update unit, which includes the disc definition structure and an initial defect list and which has a size of one block, and wherein the disc definition structure includes location information about the initial defect list, and wherein the initial defect list provides no information about a defective area, and wherein the information reading apparatus comprising:

a reading section for reading information from the write-once information recording medium, and a control section for controlling the reading section, and wherein the control section controls the reading section so as to read the disc management structure update unit, including the disc definition structure and having a size of one block, from the management information area and obtains the space bitmap, and wherein the control section controls the reading section so as to read either the disc management structure update unit or the second disc management structure update unit from a block at the predetermined location.

8. The information reading apparatus of claim 7, wherein the block at the predetermined location is located at the top of multiple readable and writable blocks in the management information area.

9. An information reading method for reading information from a write-once information recording medium, which has at least one recording layer and on which information is written on a block-by-block basis, wherein the write-once information recording medium comprises:

a user data area on which user data is going to be written; and a management information area to store management information about the write-once information recording medium, and wherein the user data area is provided for each said recording layer, and wherein the management information comprises:

a space bitmap including bitmap information for use to manage recording statuses in the user data area on a predetermined one of the recording layers; and a disc definition structure including location information of the space bitmap, and wherein the size of the space bitmap is determined so that the combined size of the space bitmap itself and the disc definition structure always becomes equal to that of one block, irrespective of the size of the user data area, and wherein if the size of the user data area on the predetermined recording layer exceeds a predetermined one, multiple space bitmaps are generated for the user data area of the predetermined recording layer, and a disc management structure update unit, including one of the multiple space bitmaps and the disc definition structure and having a size of one block, is written on the management information area, and wherein on a block at a predetermined location in the management information area, written is either the disc management structure update unit or a second disc management structure update unit, which includes the disc definition structure and an initial defect list and which has a size of one block, and wherein the disc definition structure includes location information about the initial defect list, and wherein the initial defect list provides no information about a defective area, and wherein the information reading method includes the steps of:
reading the disc management structure update unit, including the disc definition structure and having a size of one block, from the management information area and obtains the space bitmap, and
reading either the disc management structure update unit or the second disc management structure update unit from a block at the predetermined location in the management information area.

10. The information reading method of claim 9, wherein the block at the predetermined location is located at the top of multiple readable and writable blocks in the management information area.

* * * * *

UNITED STATES PATENT AND TRADEMARK OFFICE
CERTIFICATE OF CORRECTION

PATENT NO. : 8,199,621 B2
APPLICATION NO. : 12/649412
DATED : June 12, 2012
INVENTOR(S) : Yoshihisa Takahashi et al.

It is certified that error appears in the above-identified patent and that said Letters Patent is hereby corrected as shown below:

Title Page, Item (56) under FOREIGN PATENT DOCUMENTS,
After JP 2006-512699, "4/2004" should read -- 4/2006 --; and After JP 2006-520513, "9/2004" should read -- 9/2006 --.

Signed and Sealed this
Second Day of July, 2013

Teresa Stanek Rea
*Acting Director of the United States Patent and Trademark Office*